US008660072B2

(12) United States Patent
Siomina et al.

(10) Patent No.: US 8,660,072 B2
(45) Date of Patent: Feb. 25, 2014

(54) METHODS AND APPARATUS FOR IMPROVED REFERENCE SIGNAL CORRELATION CHARACTERISTICS

(75) Inventors: Iana Siomina, Solna (SE); Dirk Gerstenberger, Stockholm (SE); Muhammad Kazmi, Bromma (SE); Daniel Larsson, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 372 days.

(21) Appl. No.: 12/982,312

(22) Filed: Dec. 30, 2010

(65) Prior Publication Data

US 2011/0176499 A1 Jul. 21, 2011

Related U.S. Application Data

(60) Provisional application No. 61/295,846, filed on Jan. 18, 2010.

(51) Int. Cl.
*H04W 4/00* (2009.01)

(52) U.S. Cl.
USPC .......................................... 370/329; 370/509

(58) Field of Classification Search
USPC .......... 370/203, 208, 310, 310.1, 310.2, 328, 370/329, 345, 350, 464, 498, 503, 504, 370/509; 455/403, 422.1, 456.1, 456.2
See application file for complete search history.

(56) References Cited

U.S. PATENT DOCUMENTS

| 6,993,084 | B1 * | 1/2006 | Eberlein et al. ............... 375/260 |
| 7,383,057 | B1 | 6/2008 | Senarath et al. |
| 2003/0114169 | A1 * | 6/2003 | Okamura et al. ............. 455/456 |
| 2008/0031368 | A1 | 2/2008 | Lindoff et al. |
| 2010/0246527 | A1 * | 9/2010 | Montojo et al. ............... 370/330 |
| 2010/0260154 | A1 * | 10/2010 | Frank et al. .................... 370/336 |
| 2012/0040691 | A1 * | 2/2012 | Han et al. ..................... 455/456.1 |
| 2012/0046047 | A1 * | 2/2012 | Popovic et al. ............. 455/456.1 |

FOREIGN PATENT DOCUMENTS

| EP | 1 871 028 A1 | 12/2007 |
| WO | 2009/134174 A1 | 11/2009 |
| WO | 2009/151361 A1 | 12/2009 |

OTHER PUBLICATIONS

EPO, Int'l Search Report in PCT/SE2011/050008, Aug. 19, 2011.
EPO, Written Opinion in PCT/SE2011/050008, Aug. 19, 2011.
3GPP Draft R1-092007, Ericsson: "Extension to Costas arrays for PRS pattern in normal subframes" Apr. 29, 2009, pp. 1-6, XP050339477.
3GPP Draft R1-091314, Ericsson: "Reference Signals for Low Interference Subframes in Downlink" Mar. 18, 2009, XP002636007.
3GPP TS 36.211, V9.0.0 Technical Specification Group Radio Access Network; Evolved Universal Terrestrial Radio Access (E-UTRA); Physical Channels and Modulation (Release 9), Dec. 2009.

(Continued)

*Primary Examiner* — Obaidul Huq
(74) *Attorney, Agent, or Firm* — Potomac Patent Group PLLC

(57) ABSTRACT

The auto-correlation properties of a reference signal or pilot pattern, such as a position reference signal (PRS) in a Long Term Evolution communication system, is improved by modifying the currently specified PRS patterns, and/or by PRS pattern shaping. Pattern shaping can result in creation of virtual PRS patterns, for example, by controlling the PRS transmitted or received power used by the correlator. PRS power shaping can be implemented differently according to the location where the PRS power is calculated, e.g., in a network node or in a user equipment.

23 Claims, 16 Drawing Sheets

(56) References Cited

OTHER PUBLICATIONS

3GPP TS 36.211, V9.1.0 Technical Specification Group Radio Access Network; Evolved Universal Terrestrial Radio Access (E-UTRA); Physical Channels and Modulation (Release 9), Mar. 2010.

3GPP TS 36.355, V9.2.1 Technical Specification Group Radio Access Network; Evolved Universal Terrestrial Radio Access (E-UTRA); LTE Positioning Protocol (LPP) (Release 9), Jun. 2010.

3GPP TS 36.455, V9.2.0 Technical Specification Group Radio Access Network; Evolved Universal Terrestrial Radio Access (E-UTRA); LTE Positioning Protocol A (LPPa) (Release 9), Jun. 2010.

3GPP TS 36.305, V9.3.0 Technical Specification Group Radio Access Network; Evolved Universal Terrestrial Radio Access Network (E-UTRAN); Stage 2 functional specification of User Equipment (UE) positioning in E-UTRAN (Release 9), Jun. 2010.

3GPP TS 36.213, V9.3.0 Technical Specification Group Radio Access Network; Evolved Universal Terrestrial Radio Access (E-UTRA); Physical layer procedures (Release 9), Sep. 2010.

3GPP TS 36.331, V9.1.0 Technical Specification Group Radio Access Network; Evolved Universal Terrestrial Radio Access (E-UTRA) Radio Resource Control (RRC); Protocol specification (Release 9), Dec. 2009.

3GPP TS 32.742, V8.0.0 Technical Specification Group Services and System Aspects; Telecommunication management; Configuration Management (CM); Signalling Transport Network (STN) interface Network Resource Model (NRM) Integration Reference Point (IRP); Information Service (IS) (Release 8), Dec. 2008.

3GPP Draft R4-103154 Ericsson et al. "On PRS autocorrelation properties for OTDOA" Aug. 23-27, 2010, TSG RAN WG4 Meeting #56, Madrid, Spain.

3GPP Draft R4-103151 "Draft LS on PRS Pattern correction" Aug. 23-27, 2010, TSG RAN WG4 Meeting #56, Madrid, Spain.

* cited by examiner

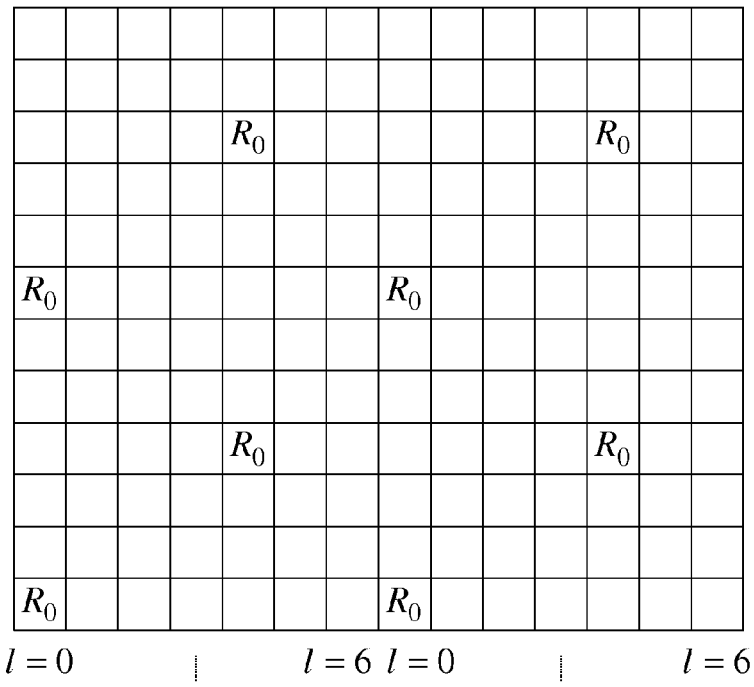
Antenna Port 0
FIG. 3A
PRIOR ART
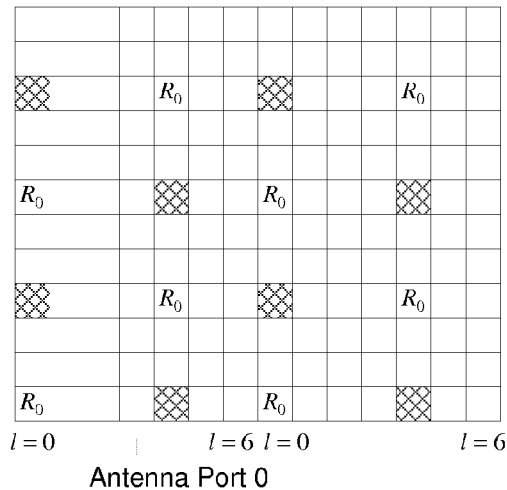
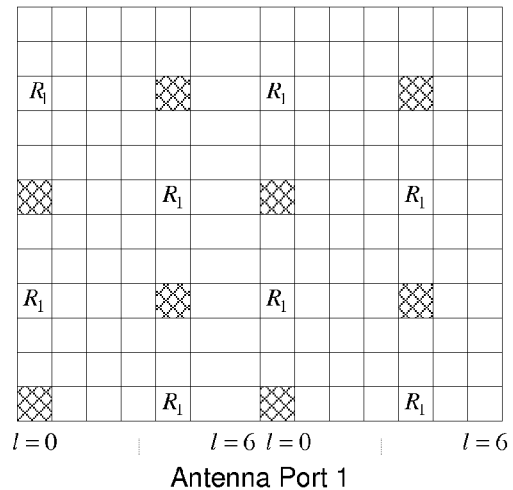
FIG. 3B
PRIOR ART

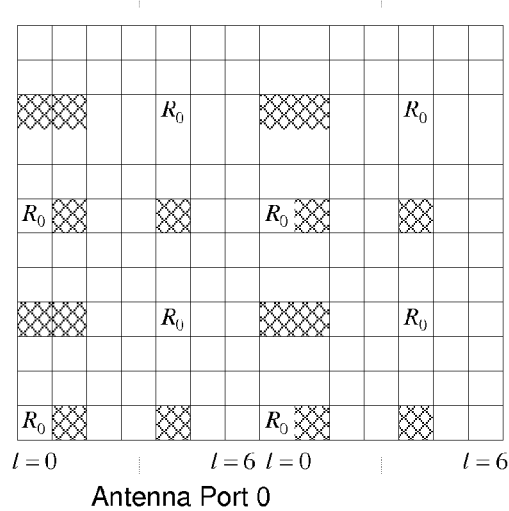
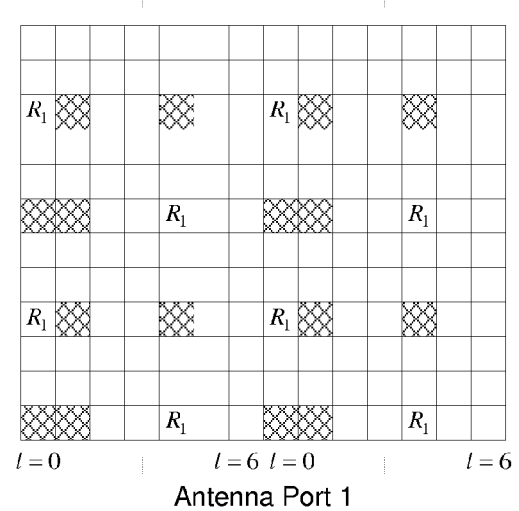
FIG. 3C
PRIOR ART
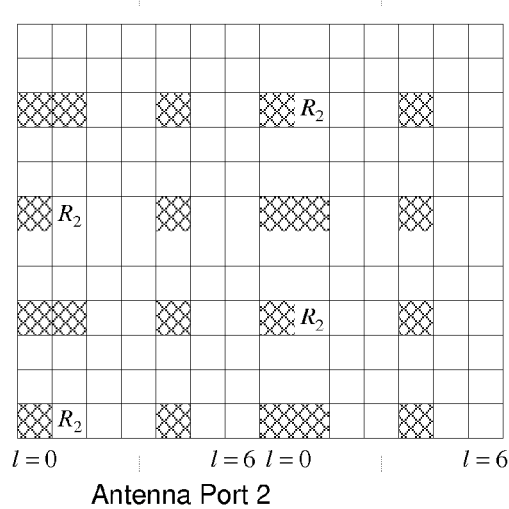
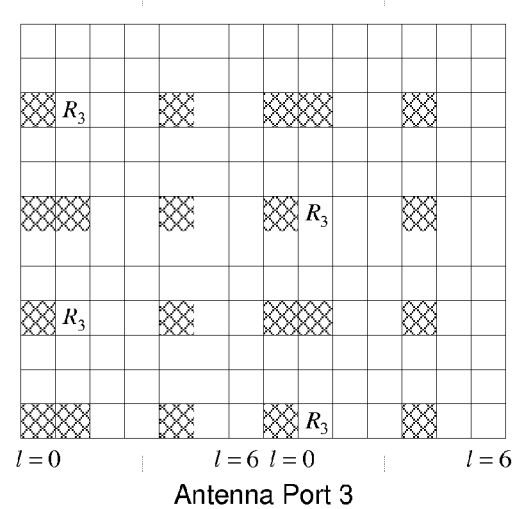
FIG. 3D
PRIOR ART

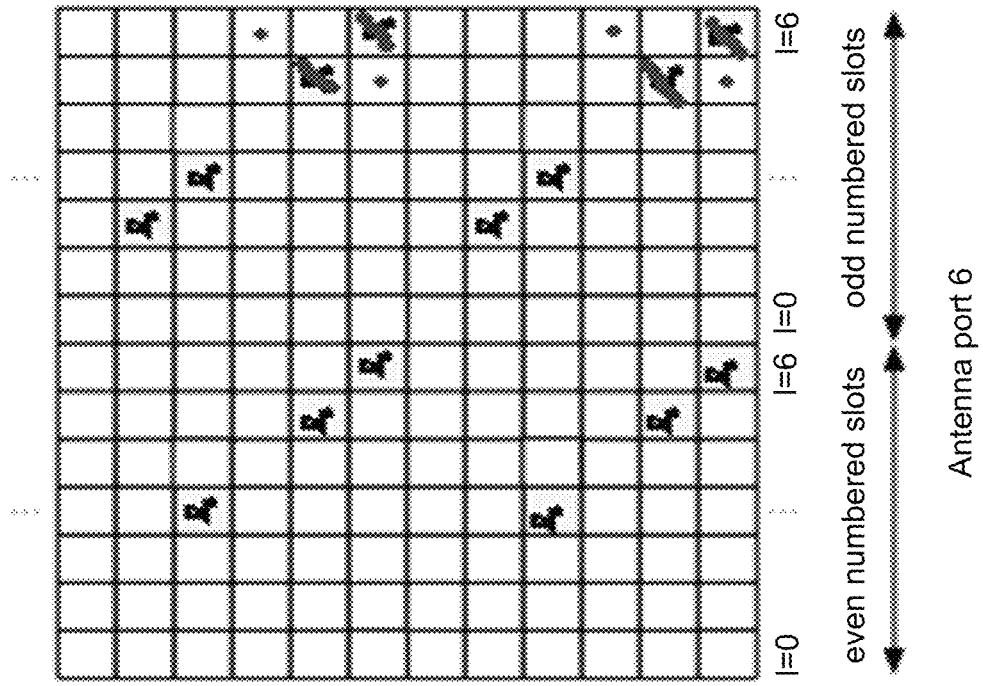
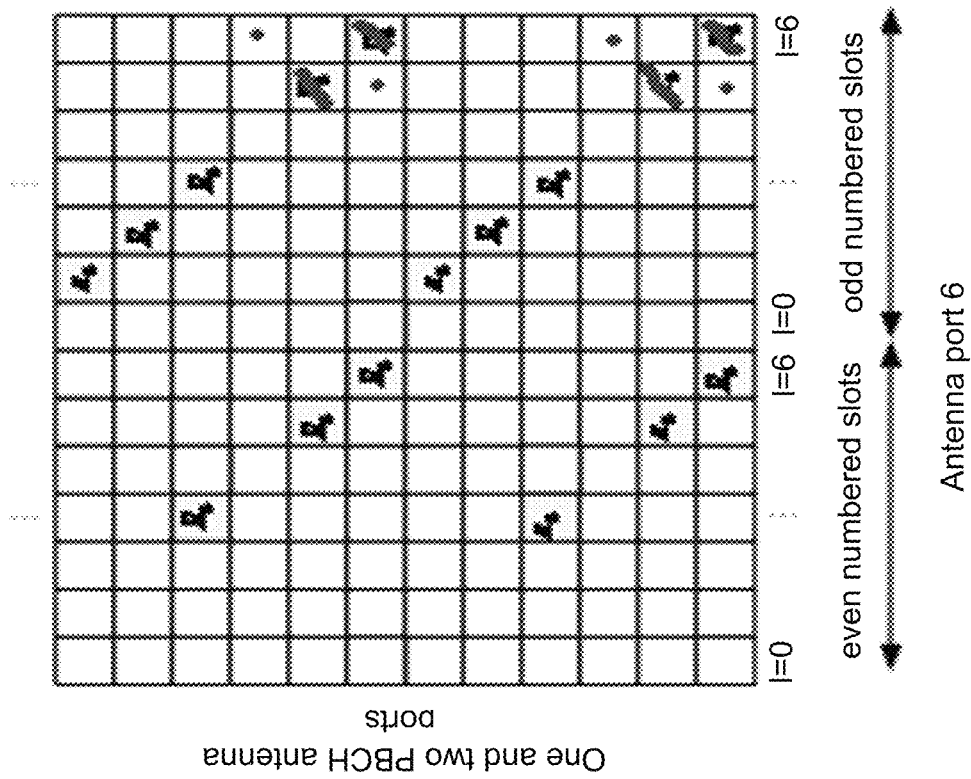
FIG. 6A

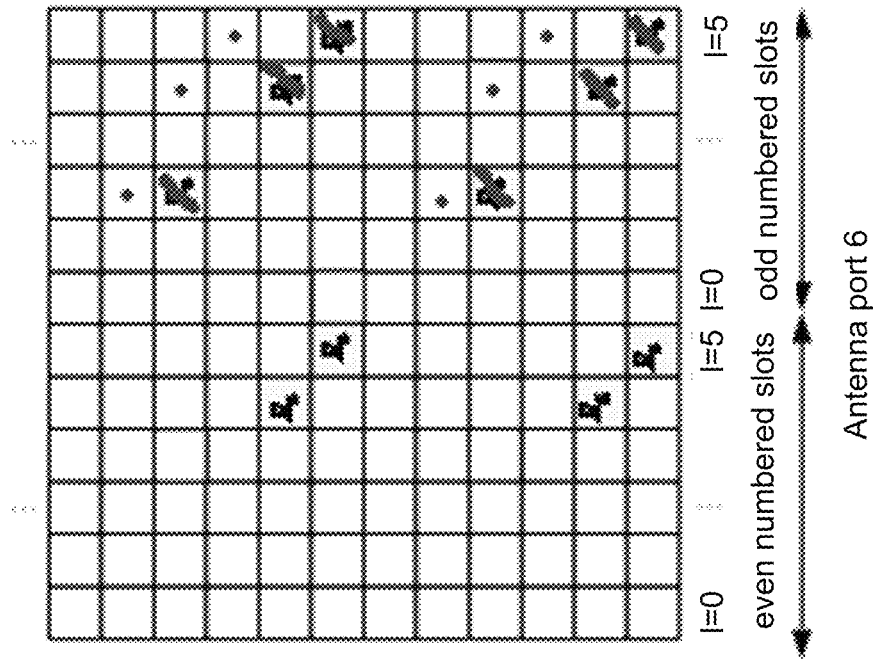
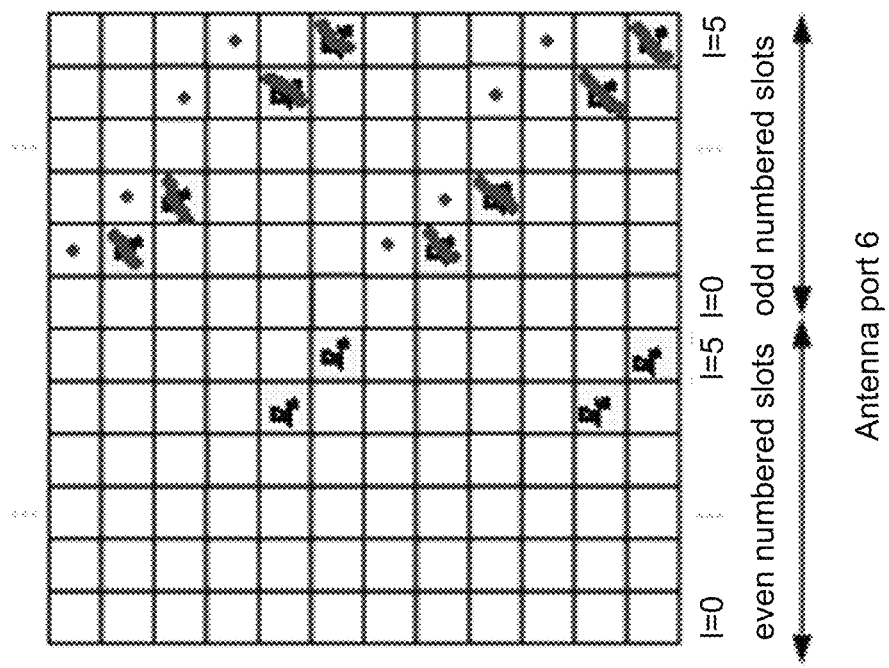
FIG. 6C

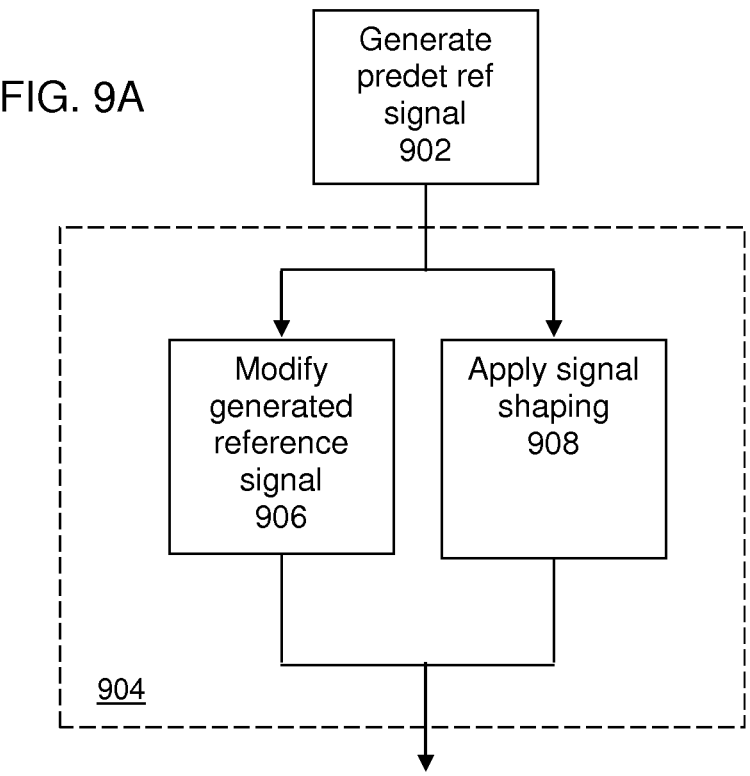

METHODS AND APPARATUS FOR IMPROVED REFERENCE SIGNAL CORRELATION CHARACTERISTICS

This application claims the benefit of the filing date of U.S. Provisional Patent Application No. 61/295,846 that was filed on Jan. 18, 2010, and that is incorporated in this application by reference.

TECHNICAL FIELD

This invention relates to wireless communications networks and more particularly to transmitted signal pattern design and wireless network architectures that utilize signal measurements from multiple cells for positioning, location and location-based services.

BACKGROUND

According to the Third Generation Partnership Project (3GPP) specifications for wireless communication systems (Release 8 and later Releases), a Long Term Evolution (LTE) communication system uses orthogonal frequency division multiplex (OFDM) as a multiple access technique (called OFDMA) in the downlink (DL) from system nodes to user equipments (UEs). High-Speed Packet Access (HSPA) and early versions of LTE are sometimes called "third generation" (3G) communication systems. LTE-Advanced (Release 10 and later) has been ratified as a "fourth generation" (4G) communication system. The LTE specifications can be seen as an evolution of current wideband code division multiple access (WCDMA) specifications. The 3GPP promulgates specifications for LTE, HSPA, WCDMA, and other communication systems.

LTE communication channels are described in 3GPP Technical Specification (TS) 36.211 V9.1.0, Physical Channels and Modulation (Release 9) (December 2009) and other specifications. For example, control information exchanged by evolved NodeBs (eNodeBs) and user equipments (UEs) is conveyed by physical uplink control channels (PUCCHs) and by physical downlink control channel (PDCCHs). In an OFDMA communication system, a data stream to be transmitted is portioned among a number of narrowband subcarriers that are transmitted in parallel. In general, a physical resource block is a particular number of particular subcarriers used for a particular period of time. Different groups of subcarriers can be used at different times for different purposes and different users. OFDMA communication systems are described in the literature, for example, U.S. Patent Application Publication No. US 2008/0031368 A1 by B. Lindoff et al.

The possibility of identifying user geographical location, or position, in a system has enabled a large variety of commercial and non-commercial services, e.g., navigation assistance, social networking, location-aware advertising, emergency calls, etc. Different services can have different positioning accuracy requirements imposed by the application. In addition, some regulatory requirements on the positioning accuracy for basic emergency services exist in some countries, e.g., FCC E911 in the U.S., which puts an extra burden on the desired quality of the positioning service.

FIG. 1A illustrates a user plane of an exemplary positioning architecture in an LTE cellular communication system 100 that includes UEs 110, 120, a radio access network (RAN) that includes a plurality of eNodeBs 130-1, 130-2, . . . , 130-N, and a core network that includes a serving gateway (SGW) node 140 and a packet data network 150. The system 100 also includes a positioning node 160, which in the user plane is called a Secure user-plane Location (SUPL) Platform (SLP). In the user plane of a positioning architecture, the UEs 110, 120 are more precisely called SUPL enabled terminals (SETs).

Each eNodeB 130-1, 130-2, . . . , 130-N serves a respective geographical area that is divided into one or more cells. An eNodeB can use one or more antennas at one or more sites to transmit information into its cell(s), and different antennas can transmit respective, different pilot and other signals. Neighboring eNodeBs are coupled to each other by an X2-protocol interface that supports active-mode mobility of the UEs. An eNodeB controls various radio network functions, including for example single-cell radio resource management (RRM), such as radio access bearer setup, handover, UE uplink/downlink scheduling, etc. Multi-cell RRM functions can also use the X2-protocol interfaces. Each eNodeB also carries out the Layer-1 functions of coding, decoding, modulating, demodulating, interleaving, de-interleaving, etc., and the Layer-2 retransmission mechanisms, such as hybrid automatic repeat request (HARQ). The eNodeBs 130-1, 130-2, . . . , 130-N are coupled to one or more SGWs 140 (only one of which is shown in FIG. 1A).

FIG. 1B illustrates a control plane of the exemplary positioning architecture in the LTE communication system 100. In the control plane as shown, an LTE-Uu protocol interface couples the UE 110 to the eNodeB 130, and an S1-MME protocol interface couples the eNodeB 130 to a Mobility Management Entity (MME) 140, which is a name for the SGW in the control plane. The positioning node 160 is called an evolved Serving Mobile Location Center (E-SMLC) in the control plane, and is coupled to the MME 140 by a signaling link selection (SLs) protocol interface. It will be understood that there can be a communication interface between the SLP and E-SMLC for interworking in the positioning node 160. 3GPP has standardized two protocols specifically to support positioning in LTE: an LTE Positioning Protocol (LPP) and an LTE Positioning Protocol Annex (LPPa). Messaging according to those protocols is also depicted in FIG. 1B.

The LPP is a point-to-point protocol between a location services (LCS) server, such as the E-SMLC 160, and a LCS target device, such as the UE 110, that is used to position the target device. Transmitted LPP messages are transparent to an MME 140, and use radio resource control (RRC) protocol messages for transport over an LTE-Uu interface between the UE 110 and the eNodeB 130, and then S1 application protocol (S1AP) messages over the S1-MME interface between the eNodeB 130 and the MME 140, and then LCS-AP messages over the SLs interface between the MME 140 and the E-SMLC 160. LPP is defined in 3GPP TS 36.355 V9.2.1, LTE Positioning Protocol (LPP) (Release 9) (June 2010), for example.

LPPa is a protocol for an interface between an eNodeB and a positioning server, such as the E-SMLC 160. LPPa messages are also transparent to the MME 140, which routes LPPa message packets over the S1-MME and SLs interfaces without knowledge of the involved LPPa transactions. LPPa is specified only for control-plane positioning procedures, but with user plane/control plane interworking, LPPa can also assist the user plane by querying eNodeBs for information and eNodeB measurements not related to a UE connection. LPPa is defined in 3GPP TS 36.455 V9.2.0, LTE Positioning Protocol A (LPPa) (Release 9) (June 2010), for example.

In the user-plane positioning architecture, the SUPL service uses established data-bearing channels (i.e., the LTE user plane) and positioning protocols (i.e., LPP) for exchanging the positioning-related data between a LCS target (e.g., a SET 110, 120) and a LCS server (e.g., a SLP 160).

UEs 110, 120 are generally wireless communication devices that can be cellular radiotelephones, personal digital assistants (PDAs), Personal Communications System (PCS) terminals, laptop computers, palmtop computers, or any other type of device or appliance that includes a communication transceiver that permits the device to communicate with other devices via a wireless link. A PCS terminal can combine a cellular radiotelephone with data processing, and facsimile and data communication capabilities. A PDA can include a radiotelephone, a pager, an Internet/intranet access device, a web browser, an organizer, calendars, and/or a global positioning system (GPS) receiver. One or more of UEs 110, 120 can be referred to as a "pervasive computing" device. In some implementations, the UEs 110, 120 can include wireline telephones (e.g., Plain Old Telephone system (POTs) telephones) that are connected to a Public Switched Telephone Network (PSTN). In a positioning architecture like that depicted in FIG. 1A, a UE can also be a base station, signal relay, radio repeater, sensor, etc.

As described in 3GPP TS 36.305 V9.3.0, Stage 2 Functional Specification of User Equipment (UE) Positioning in E-UTRAN (Release 9) (June 2010), for example, the positioning node 160 can determine the geographic positions of UEs in the system 100 in a wide variety of ways, e.g., Global Navigation Satellite System (GNSS), Observed Time Difference Of Arrival (OTDOA), Uplink Time Difference Of Arrival (UTDOA), Enhanced Cell ID (E-CID), radio fingerprinting, etc. GNSS is a generic name for satellite-based positioning systems with global coverage. Examples of GNSS systems include the U.S. GPS, the European Galileo, the Russian Glonass, and the Chinese Compass. With GNSS, a position is typically obtained by triangulation based on measurements of times of arrival of reference signals. OTDOA uses timing measurements conducted on downlink (DL) reference signals received from multiple locations, and UTDOA uses timing measurements performed on UL reference signals received at multiple locations.

In OTDOA and UTDOA, the position is obtained by multi-lateration or triangulation based on intersections of hyperbolas or circles. Methods based on multi-lateration, which is a way to determine a geometrical position from intersection of multiple surfaces, e.g., spheres or hyperboloids, require measurements from multiple sites, such as eNodeB antennas, with a good geometry; ideally at least three such sites are necessary for a two-dimensional (2D) position and four sites for a three dimensional (3D) position, which in practice means that a UE needs to measure significantly more cells, also because some of them are co-located.

In radio fingerprinting positioning, the positioning node 160 uses information in a radio fingerprint database that stores radio fingerprints derived from Evolved Universal Terrestrial Radio Access Network (E-UTRAN) and/or Inter-Radio Access Technology (IRAT) measurement data. The E-UTRAN and/or IRAT measurement data can be provided to the positioning node 160 in conjunction with precise geographic position data obtained at the same geographic location at which the E-UTRAN and/or IRAT measurements were performed (e.g., GPS position data). The positioning node 160 can subsequently receive E-UTRAN and/or IRAT radio fingerprint measurement data from UEs 110, 120 and perform a lookup in the radio fingerprint database to identify a stored radio fingerprint that matches the received E-UTRAN and/or IRAT radio fingerprint measurement data, and to retrieve a stored geographic position that corresponds to the matching radio fingerprint. The positioning node 160 can provide this geographic position to the UE that sent the radio fingerprint measurement data, or to other destinations, such as, for example, an emergency or police call center.

The network 100 can exchange information with one or more other networks of any type, including a local area network (LAN); a wide area network (WAN); a metropolitan area network; a telephone network, such as a public switched terminal network or a public land mobile network; a satellite network; an intranet; the Internet; or a combination of networks. It will be appreciated that the number of nodes illustrated in FIG. 1 is purely exemplary. Other configurations with more, fewer, or a different arrangement of nodes can be implemented. Moreover, one or more nodes in FIG. 1 can perform one or more of the tasks described as being performed by one or more other nodes in FIG. 1. For example, parts of the functionality of the eNodeBs can be divided among one or more base stations and one or more radio network controllers, and other functionalities can be moved to other nodes in the network.

FIG. 2 is a frequency-vs.-time plot showing an arrangement of downlink (DL) subcarriers, or tones, in an LTE system. In general as specified in 3GPP 36.211, DL signals in the frequency division duplex (FDD) mode of LTE are organized into successive frames of 10 milliseconds (ms) duration. Each frame is divided into ten successive subframes, and each subframe is divided into two successive time slots of 0.5 ms. Each slot includes either three, six or seven OFDM symbols, depending on whether the symbols include long (extended) or short (normal) cyclic prefixes. An LTE physical resource block (RB) comprises a group of resource elements (REs) spanning twelve consecutive subcarriers in the frequency domain and one time slot in the time domain. A physical RB is illustrated by the shaded area in FIG. 2 for symbols having a normal cyclic prefix. The subcarriers are spaced apart by fifteen kilohertz (kHz) and together occupy approximately 180 kHz in frequency. In an Evolved Multicast Broadcast Multimedia Services (MBMS) Single Frequency Network (MBSFN), the subcarriers are spaced apart by either 15 kHz or 7.5 kHz. A RE spans one subcarrier (frequency domain) and one symbol (time domain). It will be understood that RBs could include other numbers of subcarriers for other periods of time in other communication systems.

In the case of OFDM transmission, an eNodeB transmits reference signals comprising known reference symbols on known subcarriers in the OFDM frequency-vs.-time grid. For example, cell-specific reference signals (CRS) are described in Clauses 6.10 and 6.11 of 3GPP TS 36.211 V9.0.0, Evolved Universal Terrestrial Radio Access (E-UTRA), Physical Channels and Modulation (Release 9) (December 2009). A UE uses its received versions of the known reference signals to estimate characteristics, such as the impulse response, of its DL channel. The UE can then use the estimated channel matrix for coherent demodulation of the received DL signal, and obtain the potential beam-forming gain, spatial diversity gain, and spatial multiplexing gain available with multiple antennas. In addition, the reference signals can be used to do channel quality measurement to support link adaptation.

Up to four CRS corresponding to up to four transmit antennas of an eNodeB are currently specified, and FIG. 3A shows the arrangement of reference symbols in a subframe for one antenna, FIG. 3B shows the arrangement of reference symbols in a subframe for two antennas, and FIGS. 3C, 3D depict the arrangement of reference symbols in a subframe for four antennas.

FIG. 3A shows a frequency-vs.-time grid that includes reference symbols $R_0$ that are transmitted at known subcarrier and time symbols in a subframe from an eNodeB having one antenna port 0. In FIG. 3A, the reference symbol $R_0$ is depicted as transmitted on every sixth subcarrier in OFDM symbol 0 and OFDM symbol 4 in every seven-symbol (normal cyclic prefix) time slot. Also, the reference symbols $R_0$ in OFDM symbol 4 are offset by three subcarriers relative to the reference symbols in OFDM symbol 0, the first OFDM symbol in a slot. It should be understood that the reference symbols $R_0$ can be transmitted in other OFDM symbols depending on whether the symbols have long or short cyclic prefixes. For example, the reference symbols $R_0$ can be transmitted in OFDM symbol 3 when the OFDM symbols have long cyclic prefixes.

FIG. 3B shows frequency-vs.-time grids that include reference symbols $R_0$ that are transmitted at known frequencies and time instants in a subframe from an antenna port 0 (which is the same as FIG. 3A) and reference symbols $R_1$ that are transmitted at known frequencies and time instants in a subframe from an antenna port 1. Cross-hatched REs indicate reference symbols that are not transmitted by a particular antenna port.

FIGS. 3C and 3D show frequency-vs.-time grids that include reference symbols $R_0$ from an antenna port 0 (which is the same as FIG. 3A), reference symbols $R_1$ that are transmitted from an antenna port 1 (which is the same as FIG. 3B), reference symbols $R_2$ that are transmitted from an antenna port 2, and reference symbols $R_3$ that are transmitted from an antenna port 3. As in FIG. 3B, cross-hatched REs in FIGS. 3C, 3D indicate reference symbols that are not transmitted by a particular antenna port. It will be noted in FIG. 3D that the reference symbols $R_2$, $R_3$ are depicted as transmitted in OFDM symbols 1, 5, respectively, in every seven-symbol time slot.

Some communication systems, such as LTE-Advanced, can employ more than four transmit antennas in order to achieve better performance. For example, a system having eNodeBs with eight transmit antennas will need extensions of the LTE CRS signals described above.

To enable positioning in LTE and facilitate positioning measurements of a proper quality and for a sufficient number of distinct locations, new physical signals dedicated for positioning, called positioning reference signals (PRS), have been introduced and specific positioning subframes have been agreed in 3GPP, although the existing CRS described above can in principle also be used for positioning.

PRS and Positioning Subframes in LTE

PRS are transmitted from one antenna port (R6) according to a pre-defined pattern, as described for example in Clause 6.10.4 of 3GPP TS 36.211 V9.0.0, Evolved Universal Terrestrial Radio Access (E-UTRA), Physical Channels and Modulation (Release 9) (December 2009). One of the currently agreed PRS patterns is shown in FIG. 4, which corresponds to the left-hand side of FIG. 6.10.4.2-1 of 3GPP TS 36.211, where the grey squares indicate PRS resource elements that include reference symbols $R_6$ from an antenna port 6 within an RB in frequency and one subframe in time with the normal cyclic prefix. A physical broadcast channel (PBCH) can be transmitted from one or two antenna ports in the RBs.

A set of frequency shifts can be applied to the pre-defined PRS patterns to obtain a set of orthogonal patterns which can be used in neighbor cells to reduce interference on the PRS and thus improve positioning measurements. The effective frequency reuse of six can be modeled in this way. The frequency shift is defined as a function of Physical Cell ID (PCI) as follows:

$$v_{shift} = \mathrm{mod}(PCI, 6)$$

in which $v_{shift}$ is the frequency shift, mod( ) is the modulo function, and PCI is the Physical Cell ID. The PRS can also be transmitted with zero power, or muted.

To improve hearability of the PRS, i.e., to enable a UE to detect the PRS from multiple sites and with a reasonable quality, positioning subframes have been designed as low-interference subframes, i.e., it has also been agreed that no data transmissions are allowed in general in positioning subframes, although a network can at its own risk still allow some DL transmission in positioning subframes. As a result, synchronous networks' PRS are ideally interfered with only by PRS from other cells having the same PRS pattern index, i.e., the same frequency (vertical) shift ($v_{shift}$), and not by data transmissions.

In partially aligned asynchronous networks, PRS can still be interfered with by transmissions over data channels, control channels, and any physical signals when positioning subframes collide with normal subframes, although the interference is reduced by the partial alignment, i.e., by aligning the beginnings of positioning subframes in multiple cells within one-half of a subframe with respect to some time base. PRS are transmitted in pre-defined positioning subframes grouped by several consecutive subframes ($N_{PRS}$), i.e., one positioning occasion, which occur periodically with a certain periodicity of N subframes, i.e., the time interval between two positioning occasions. The currently agreed periods N are 160, 320, 640, and 1280 ms, and the number of consecutive subframes $N_{PRS}$ can be 1, 2, 4, or 6, as described in 3GPP TS 36.211 cited above.

With the cell PCI, the PRS configuration (comprising the offset from system frame number (SFN) 0, periodicity, and the number of positioning subframes) is signaled to the UE as a part of the OTDOA assistance data from the positioning server (e.g., an E-SMLC) to a positioning target (e.g., a UE) using the LPP protocol. The PRS pattern for PRS resource elements in the time-frequency domain, as described above, can be found out by the UE from the cell PCI.

Correlation Properties of Reference Signal Patterns

Signals, including reference signals used for positioning (PRS or CRS in LTE), typically do not have ideal correlation (auto- and cross-correlation) properties. Better auto-correlation properties enhance the resolvability of multipath, which is very important, for example, in urban environments where OTDOA is expected to complement Assisted Global Positioning System (A-GPS). Poor auto-correlation properties may also affect the search window size, which is used to identify the PRS pattern by detecting the correlation peak. For instance, poor auto-correlation properties of the PRS pattern constrain the UE to use a more precise search window in order to avoid searching for the unnecessary correlation peaks (i.e., side lobes). On the other hand, the search window depends on the UE location uncertainty. Ideally, the maximum search window is defined by a range [−r, r], where r is the maximum cell range.

A general observation known in the art is that the best auto-correlation properties are achieved when the signal is transmitted over all subcarriers (with uniform sum energy density over the subcarriers) during a coherent time interval, although not necessarily on all subcarriers in each OFDM symbol. This is because the auto-correlation of a periodic function is, itself, periodic with the same period, which means that the presence of a periodic component in the pattern may generate side-lobe auto-correlation peaks.

Transmitting the signal over the entire bandwidth in a symbol is not a good approach in a synchronous network from an interference-management point of view, unless predefined time-offsets are applied in different cells to mimic frequency reuse. This means that it is preferable to transmit reference signals according to a predefined pattern. Furthermore, a higher frequency reuse is desirable in networks where the interference is crucial (e.g., with high load, short inter-site distance, etc.). Such a sparseness property is enjoyed, for example, by patterns designed based on Costas arrays, which are traditionally used in sonar and radar communication. A Costas array is a geometrical set of n points lying on the squares of a n×n checkerboard, such that each row or column contains only one point, and that all of the n(n−1)/2 displacement vectors between each pair of dots are distinct. In practice, however, it is not always possible to achieve patterns with optimal correlation properties.

The frequency-time transmission patterns for PRS currently defined by 3GPP TS 36.211 have correlation properties that can be insufficiently good for positioning in a "rich" multipath environment, i.e., an environment with a large number of multipath signals. As an illustrative example, FIGS. 5A, 5B show the correlator outputs for twenty-five PRS RBs with normal and extended CP, respectively, versus time shown in meters (converted by multiplying time by the speed of light in meters per second). Periodic strong side lobes can be seen, for example, at about 3 km, 6 km, and so on.

Furthermore, there is no possibility to control PRS power within a subframe, because, as stated in Clause 5.2 of 3GPP TS 36.213 V9.3.0, Evolved Universal Terrestrial Radio Access (E-UTRA), Physical Layer Procedures (Release 9) (September 2010): "A UE may assume that downlink positioning reference signal EPRE [energy per resource element] is constant across the positioning reference signal bandwidth and across all OFDM symbols that contain positioning reference signals in a given positioning reference signal occasion."

SUMMARY

The auto-correlation properties of a reference signal or pilot pattern, such as a PRS, can be improved in hard and/or soft ways, which is to say, respectively, by modifying the currently specified PRS patterns, and/or by PRS pattern shaping (i.e., creating virtual PRS patterns), e.g., by controlling the PRS transmitted power or the received power used as input to the correlator. PRS power shaping can be implemented differently according to the location where the PRS power is calculated, e.g., in a network node or in a UE.

According to one aspect of this invention, there is provided a method of using reference signals (RS) in an orthogonal frequency division multiplex communication system in which the RS are organized in a RS pattern of resource elements (REs) that includes a first plurality of columns corresponding to symbols and a second plurality of rows corresponding to subcarriers. The method includes forming a modified RS pattern based on a predetermined RS pattern by at least one of: cyclically shifting REs in at least one column of the predetermined RS pattern; assigning respective different transmission power levels to selected REs of the predetermined RS pattern; and adjusting a received signal power of selected REs of the predetermined RS pattern.

According to another aspect of this invention, there is provided a reference signal generator in an orthogonal frequency division multiplex communication system in which reference signals (RS) are organized in a RS pattern of resource elements (REs) that includes a first plurality of columns corresponding to symbols and a second plurality of rows corresponding to subcarriers and/or that includes a set of power levels of RS REs. The generator includes an electronic processor configured to form a modified RS pattern based on a predetermined RS pattern by at least one of: cyclically shifting REs in at least one column of the predetermined RS pattern; assigning respective different transmission power levels to selected resource elements of the predetermined RS pattern; and adjusting a received signal power of selected REs of the predetermined RS pattern.

According to another aspect of this invention, there is provided an apparatus for a user equipment in an orthogonal frequency division multiplex communication system for using reference signals (RS) organized in a RS pattern of resource elements (REs). The apparatus includes a correlator; a modified RS pattern generator configured to generate a modified RS pattern based on a predetermined RS pattern that is included in a received signal, where the modified RS pattern includes selected REs of the predetermined RS pattern that have adjusted signal power levels; and an electronic processor configured to modify the received signal according to the modified RS pattern and form a modified received signal. The correlator is configured to correlate the modified received signal and the modified RS pattern and form a correlation result.

BRIEF DESCRIPTION OF THE DRAWINGS

The various objects, features, and advantages of this invention will be understood by reading this description in conjunction with the drawings, in which:

FIGS. 3A, 3B, 3C, 3D show frequency-vs.-time grids that include reference symbols transmitted from different antenna ports;

FIGS. 6A, 6B, 6C show examples of modified positioning reference signal patterns;

FIGS. 9A, 9B, 9C are flow charts of methods of generating reference signals;

DETAILED DESCRIPTION

Figure 1A:
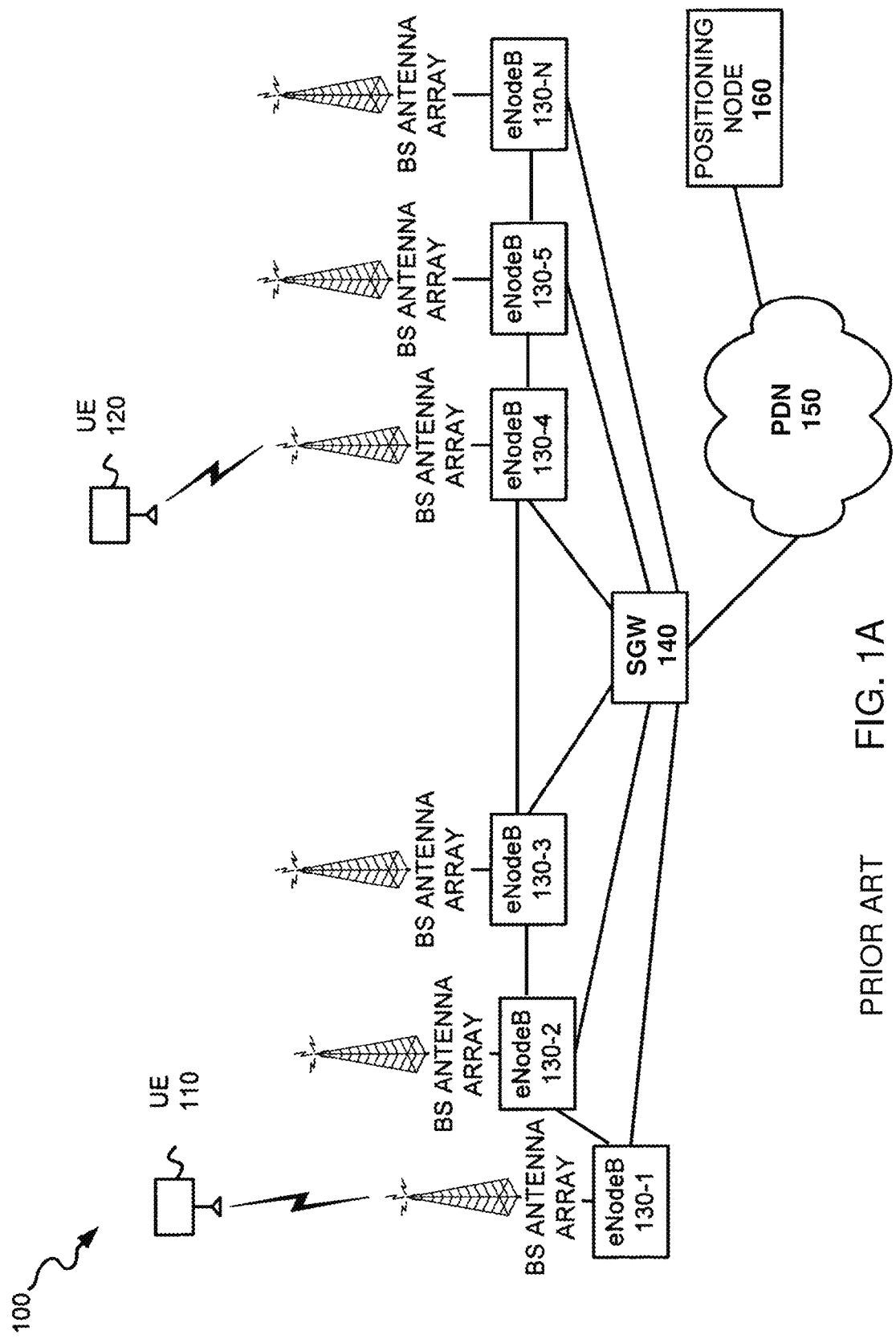
FIG. 1A illustrates a user plane of a positioning architecture in a Long Term Evolution communication system.
Figure 1B:
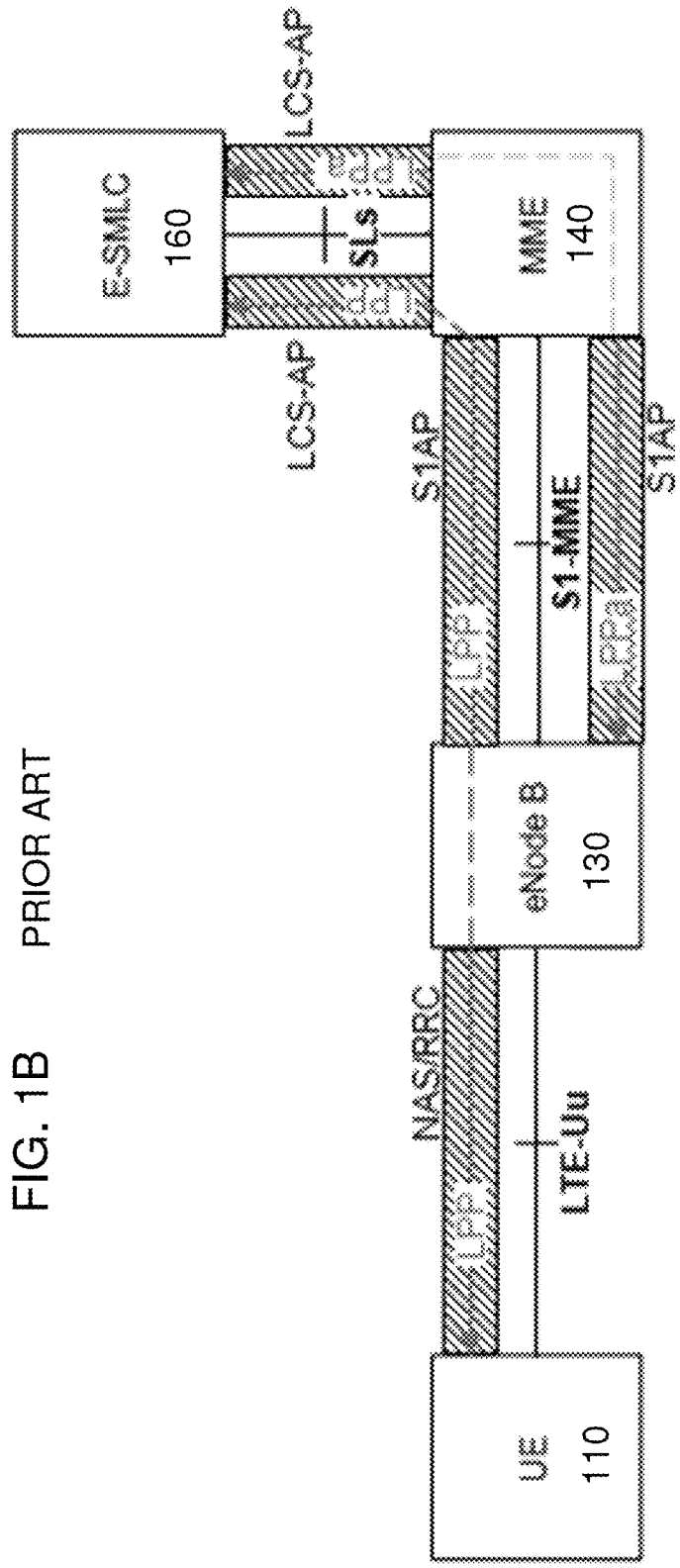
FIG. 1B illustrates a control plane of a positioning architecture in a Long Term Evolution communication system.
Figure 2:
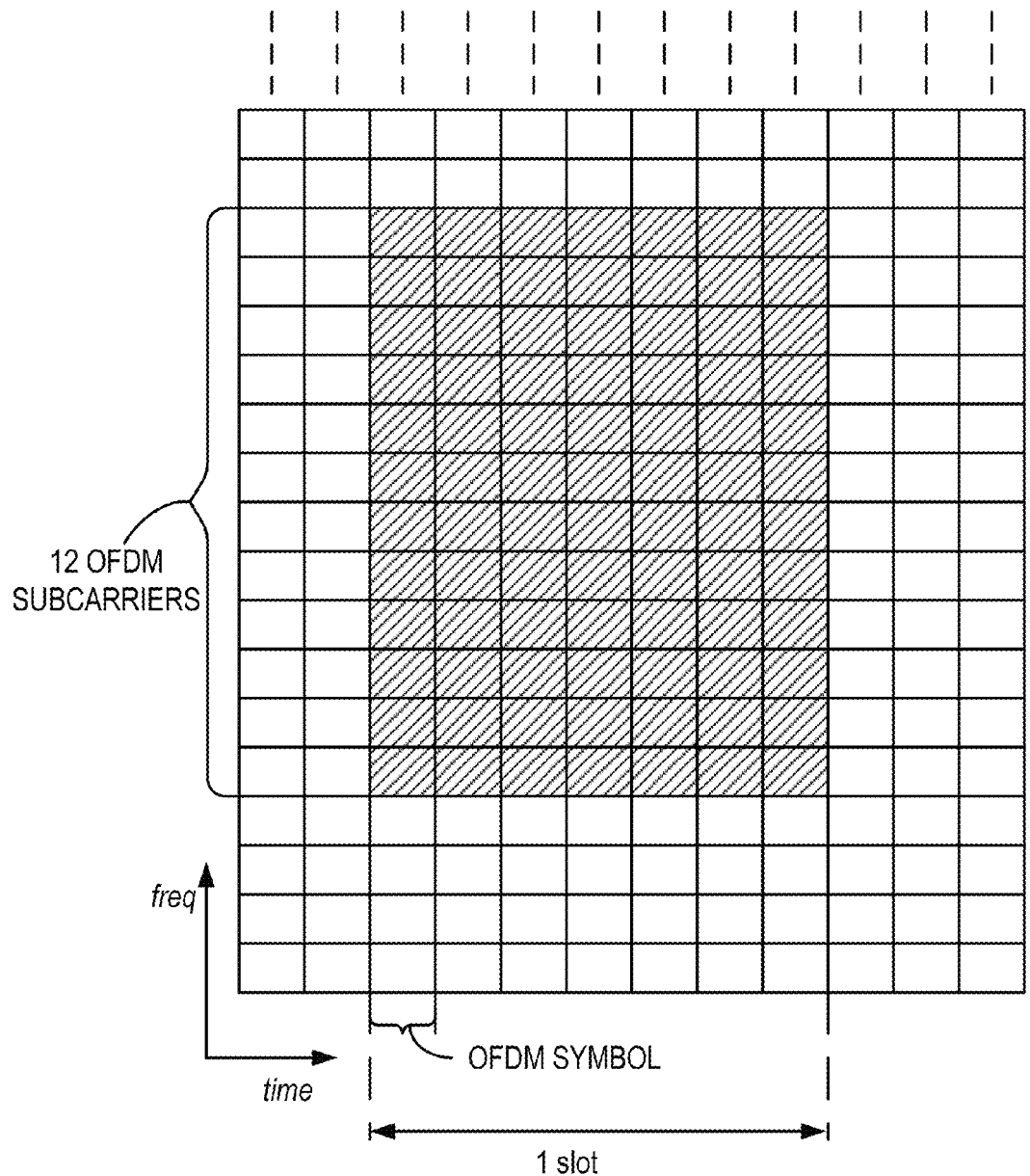
FIG. 2 is a frequency-vs.-time plot showing an arrangement of downlink subcarriers in a Long Term Evolution communication system.
Figure 4:
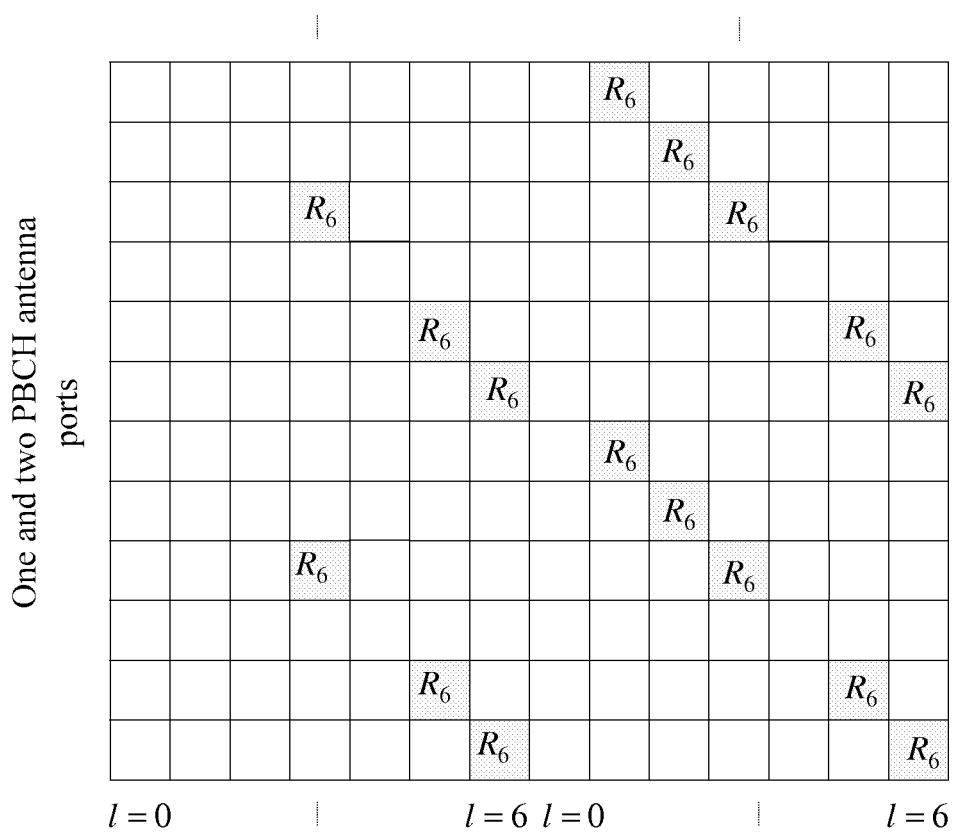
FIG. 4 shows a conventional positioning reference signal pattern.
Figure 5A:
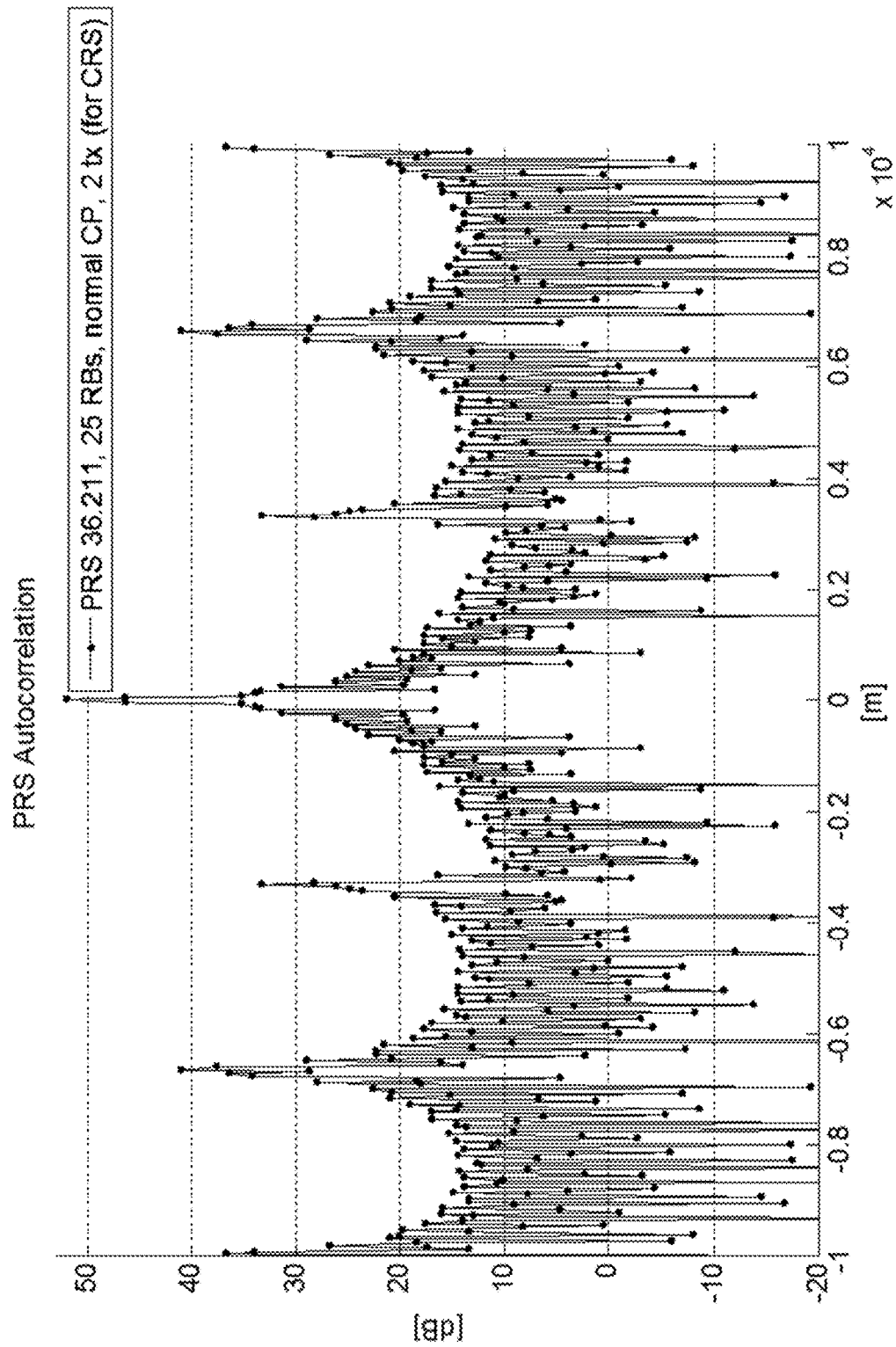
FIGS. 5A, 5B depict auto-correlation properties of conventional positioning reference signal patterns, including the pattern shown in FIG. 4.
Figure 5B:
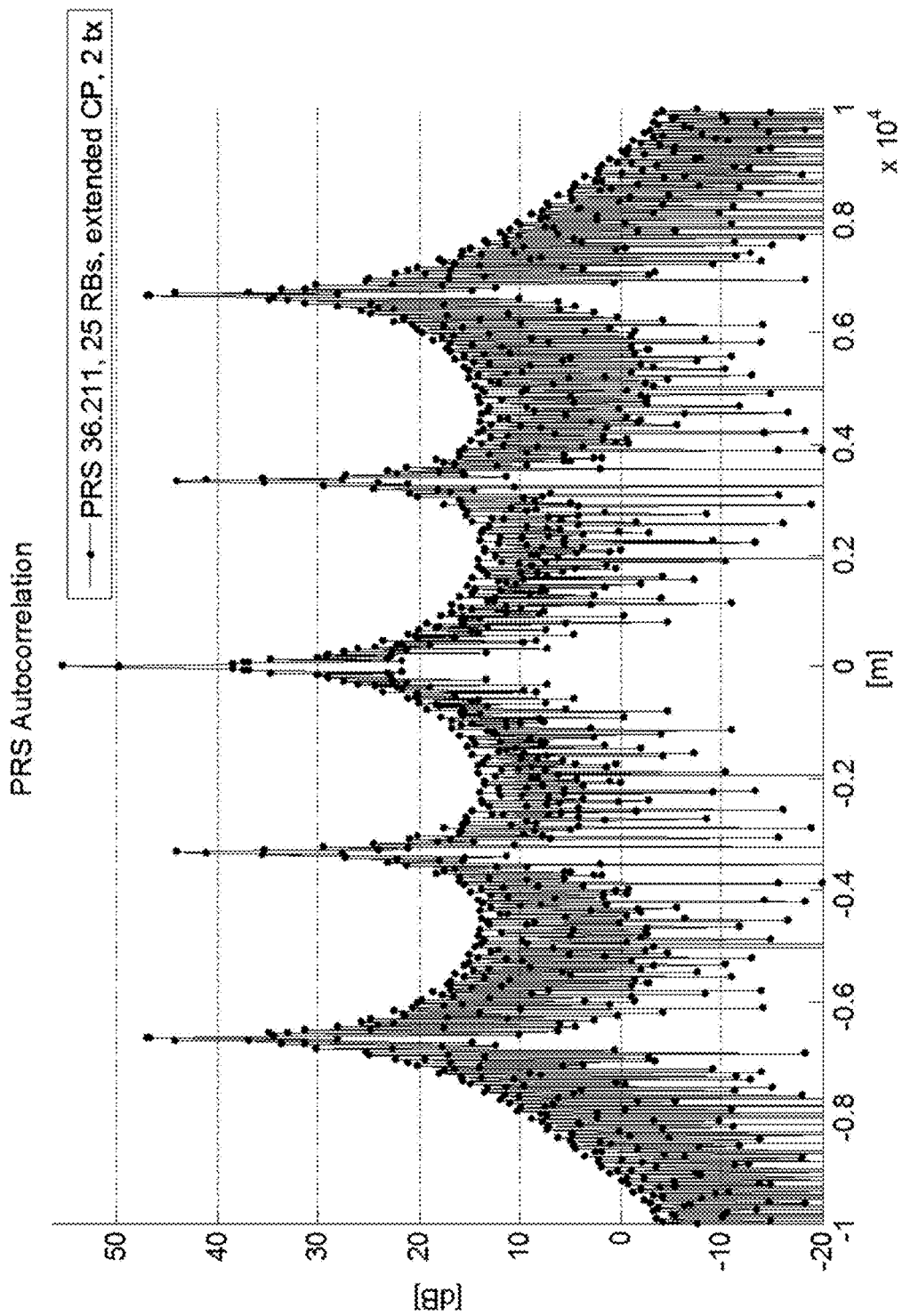

This description is written in terms of an LTE communication system but the artisan will understand that this invention can be embodied in other kinds of communication system. It will also be understood that this invention is not limited to improvement of only positioning reference signals but includes any type of reference signal or pilot pattern.

Although it is not always possible to achieve signal patterns with optimal correlation properties, this invention enables methods and apparatus to optimize a pattern. The auto-correlation properties of PRS can be improved in hard and/or soft ways, which is to say, respectively, by modifying the currently specified PRS patterns, and/or by PRS pattern shaping (i.e., creating virtual PRS patterns), e.g., by controlling the PRS transmitted or received power. Optimization can be done with respect to different objectives. In timing-measurement-based positioning, it is important to avoid secondary correlation peaks, especially in the proximity of the main peak because otherwise a correlation side lobe can be mistakenly interpreted as the main peak, which results in a false alarm.

In accordance with this invention, pattern optimization can be implemented by modifying a currently specified PRS pattern and/or by shaping a currently specified PRS pattern. Pattern shaping can be accomplished by controlling the PRS transmitted power level and/or the PRS received power level, thereby creating in effect one or more virtual PRS patterns. It will be understood, of course, that pattern shaping is also a type of pattern modification. To support PRS pattern shaping by UEs, an eNodeB can signal its PRS transmit power level to the UE over the radio interface according to either the LTE positioning protocol (LPP) or the radio resource control (RRC) protocol, and the needed information can be included in the OTDOA assistance data. In the case of the same PRS power per RE or per subcarrier (since the UE knows the PRS pattern), this PRS transmit power level information is not needed, unless muting is applied.

As described in more detail below, PRS power shaping can be implemented differently according to the location where the PRS power is calculated. In one embodiment, PRS pattern shaping is performed in the network, i.e., the PRS transmit power is set by a network node, such as an eNodeB or a positioning node (e.g., an eSMLC in the control plane in LTE, and/or another entity located inside or outside an eSMLC but with a proprietary interface, which may be a part of a user-plane positioning solution). In another embodiment, the UE reshapes its received signals before the correlator in its receiver.

Currently Specified PRS Pattern Modification

Currently specified PRS patterns can be improved by applying a strategy that includes one or more of the following rules: fill up empty subcarriers with at least one PRS RE; slightly rearrange PRS REs such that the PRS RE density over coherently accumulated segments (e.g., all symbols within a RB) is more uniform and preferably as uniform as possible; and maintain the same frequency reuse as in the standardized patterns over all symbols where PRS is transmitted. The last of the rules is currently believed to be important because, among other things, it minimizes changes to frequency allocation in a network and so facilitates implementation of this invention in existing and future networks. Moreover, modification of the currently specified signal patterns according to the rules can be realized by shifting REs in some of the columns in the PRS patterns in a cyclic way. For a cyclic shift, in other words, the same number of REs per column and the space between them (in a cyclic sense) in a currently standardized pattern are preserved in a modified pattern.

Figure 6B:
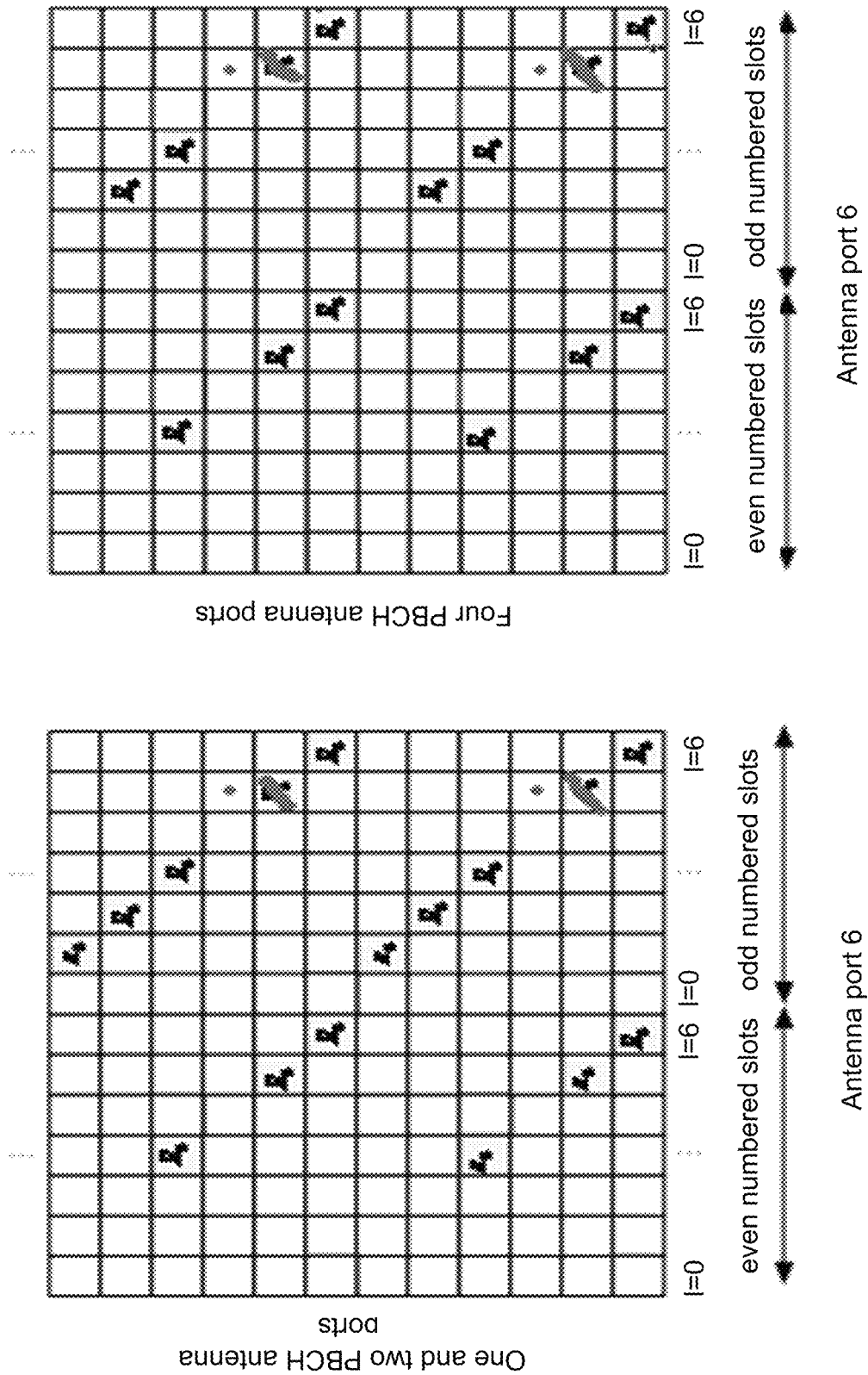

FIGS. 6A, 6B, and 6C show examples of modified patterns of reference symbols $R_6$ from antenna port 6 for normal and extended CP, respectively. Each of FIGS. 6A, 6B corresponds to the left-hand and right-hand sides of FIG. 6.10.4.2-1 of 3GPP TS 36.211. FIG. 6C corresponds to the left-hand and right-hand sides of FIG. 6.10.4.2-2 of 3GPP TS 36.211. PRS patterns following the above strategy are modified versions of the patterns specified by 3GPP TS 36.211, but they have the advantage of much better correlation properties, as illustrated by FIGS. 7A, 7B.

In FIGS. 6A, 6B, the modifications are obtained by shifting REs in the two last columns in opposite frequency directions by different numbers of subcarriers. The crossed squares are the PRS REs in the modified columns as they are in the current pattern, and the dots indicate the new PRS REs obtained by cyclic shifts in those columns. The dots in FIG. 6A are the shifted PRS REs showing a currently preferred solution in which OFDM symbol 5 in odd-numbered slots is shifted down one sub-carrier and OFDM symbol 6 in the same slots is shifted up two subcarriers. The dots in FIG. 6B are the shifted PRS REs showing a currently less preferred solution, in which OFDM symbol 5 in odd-numbered slots is shifted up one subcarrier, although it has the same correlation properties as the solution with dots depicted in FIG. 6A. A difference between the two solutions in FIGS. 6A, 6B is that the diagonal structure of the patterns is preserved with the latter, while the former is better protected against possible inter-symbol interference with CRS REs transmitted in the symbol to the left (CRS REs occur in crosses of empty rows and columns, except the first three columns (OFDM symbols) in even-numbered slots that are reserved for the control region).

As an example of a "cyclic" shift, the distance between the lower dot and the upper dot in the last column is six subcarriers (counting upward), but the distance can also be found for those two dots by counting upward from the upper dot to the top of the subframe (i.e., +3) and then from the bottom of the subframe upward to the lower dot (i.e., +3), which also totals to six. Conveniently, the total number of subcarriers is twelve, and so both counting methods yield the same total: six, but even for spacings of 5 and 7, with any cyclic shift the two distances between the REs are preserved (in a cyclic sense) since the relative positions of REs within a column are unchanged after a cyclic shift.

Figure 7A:
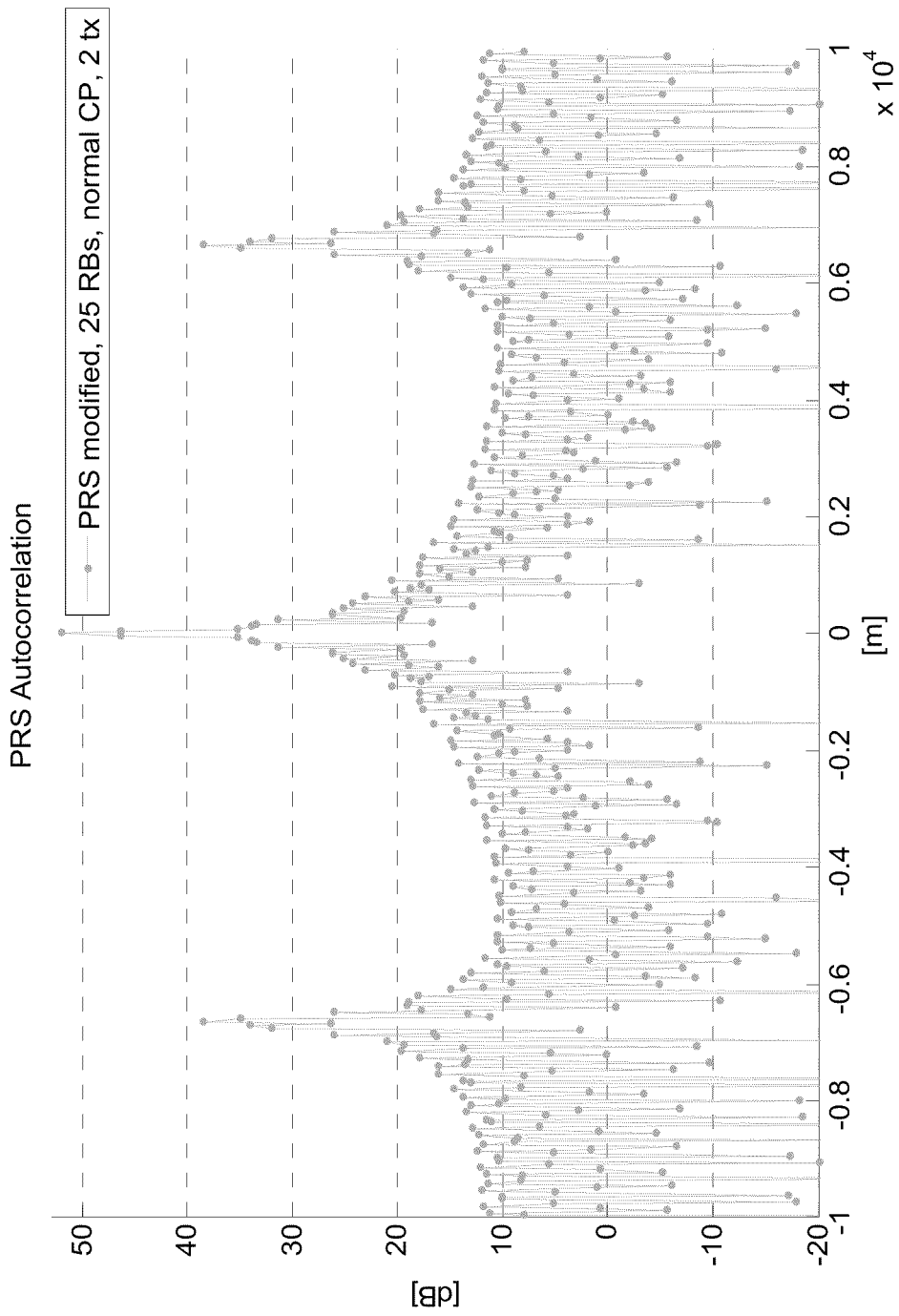
FIGS. 7A, 7B depict auto-correlation properties of the reference signal patterns shown in FIGS. 6A, 6B, 6C.
Figure 7B:
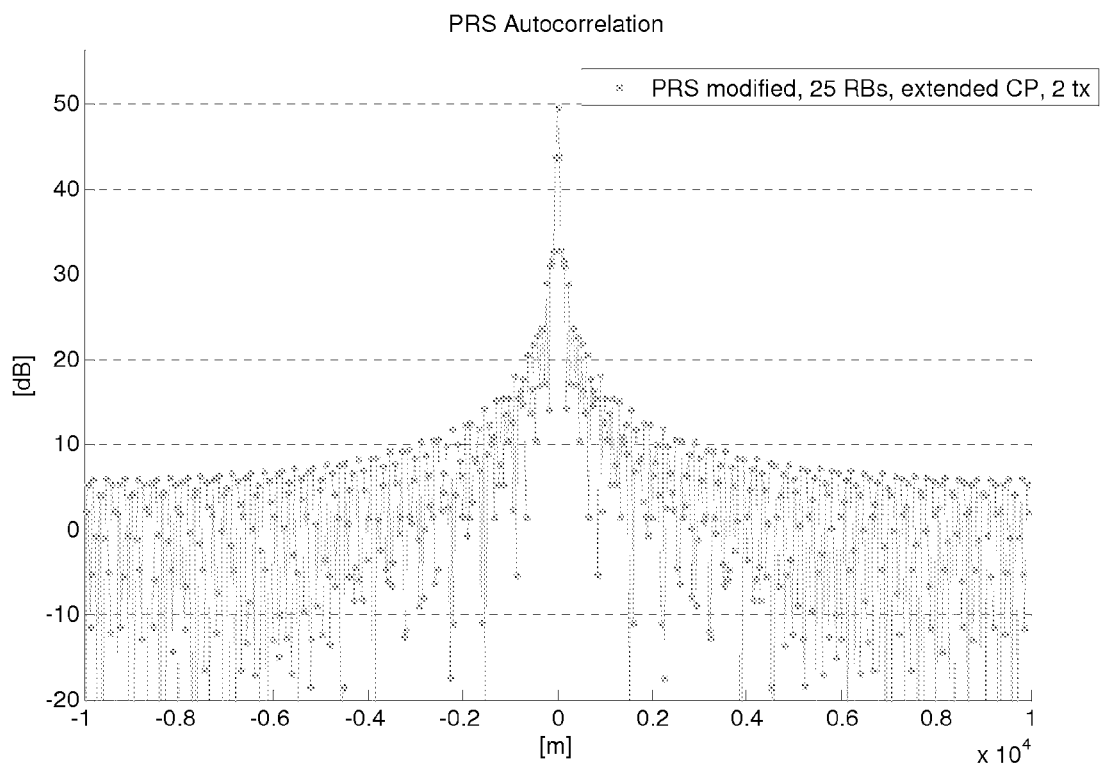

FIGS. 7A, 7B depict the improved auto-correlation properties of the modified patterns shown in FIGS. 6A, 6B, 6C. FIGS. 7A, 7B show the correlator outputs for twenty-five PRS RBs with normal and extended CP, respectively, versus time shown in meters (converted by multiplying time by the speed of light in meters per second). Side lobes at about 3 km are absent, although side lobes at about 6 km are seen. As aforementioned, the PRS patterns in FIGS. 6A, 6B have similar auto-correlation properties, which are represented in FIG. 7A. The presented results in FIGS. 7A, 7B are for only one and two PBCH antenna ports. The differences between FIGS. 7A, 7B and FIGS. 5A, 5B are significant.

PRS Pattern Shaping

Consider a receiver that includes a correlator, such as a matched filter, a shift register, etc., that generates the auto-correlation of a received predetermined signal, assuming an ideal noise-free channel. Given a correlator output R in the frequency domain, the equivalent output r in the time domain, which can be produced with an inverse discrete Fourier transform (Inverse DFT or IDFT), is given by the following expression:

$$r_n = \frac{1}{\sqrt{N}} \sum_{k=0}^{N-1} R_k e^{j2\pi nk/N}. \tag{1}$$

in which n is a time-sample index for time-domain correlation coefficient $r_n$, k is a frequency-sample index for frequency-domain correlation coefficient $R_k$, and N is the total number of IDFT samples. Note that the definition in Eq. 1 has a periodicity of N, which is to say:

$$X_{k+N} = X_k,$$

$$X_{n+N} = X_n. \tag{2}$$

By Parseval's theorem, the sum (or integral) of the square of a function is equal to the sum (or integral) of the square of its Fourier transform, and so the DFT relates the time- and frequency-domain energy as follows:

$$\sum_{n=0}^{N-1} |x_n|^2 = \frac{1}{N} \sum_{k=0}^{N-1} |X_k|^2, \qquad (3)$$

where $x_n$ is the n-th element of the (time domain) sequence $x=(x_0, \ldots, x_n, \ldots, x_{N-1})$ of N samples, $X_k$ is the k-th element of the (frequency domain) sequence $X=(X_0, \ldots, X_k, \ldots, X_{N-1})$ of N samples, which is the DFT of x. Applying the theorem to the correlator output, we get the following expression:

$$\sum_{n=0}^{N-1} (r_n)^2 = \frac{1}{N} \sum_{k=0}^{N-1} (R_k)^2. \qquad (4)$$

in which the parameters and variables are as described above.

Furthermore, from the Cauchy-Schwarz inequality, the continuous autocorrelation function reaches its peak at the origin, where it takes a real value. The same result holds in the discrete case, e.g., $|R_k| \leq R_0, k=0, \ldots, K$.

From the positioning point of view, we are interested in getting the main peak as high as possible compared to other peaks in the correlator output (ideally, there is only one peak). So, one can formulate an optimization problem to maximize the squared power of the main peak over the total energy, i.e.:

$$\frac{(\max_n r_n)^2}{\sum_{n=0}^{N-1} (r_n)^2} \to \max. \qquad (5)$$

in which the parameters and variables are as described above.

The maximum value the ratio in Eq. 5 can take is unity, otherwise it is in the open range (0,1]. Another alternative is to consider in the nominator of Eq. 5 not the power of the main peak but a metric reflecting accumulated energy in the correlation peak over a number of relevant samples, say, $2(n_0+1)$ samples with indexes in a range $+/-n_0$ relative to the main peak (zero for the main peak), e.g.:

$$\frac{\sum_{-n_0 \leq n \leq n_0} r_n^2}{\sum_{n=0}^{N-1} (r_n)^2} \to \max. \qquad (6)$$

in which the parameters and variables are as described above. The correlation coefficients r depend on transmit PRS power, PRS sequence, and the channel.

It is known that the spectrum of the autocorrelation of a signal is identical to the power spectrum of the signal, normalized by the integration period N, which is to say:

$$R_k = \frac{|X_k|^2}{N}. \qquad (7)$$

Eq. 7, however, does not cover the case when the signal $X_k$ is transmitted over several symbols. PRS signals typically span over several OFDM symbols, so for multiple coherently accumulated symbols, auto-correlation coefficients can be written as follows:

$$R_k = \frac{1}{N} \sum_{l=0}^{L-1} |X_{l,k}|^2, \qquad (8)$$

where $X_{l,k}$ is the received signal in symbol l and subcarrier k, and L is the number of such symbols where PRS is transmitted (e.g., PRS pattern width measured in symbols). With ideal receivers, the received signal is $X_{l,k}=H_{l,k}S_{l,k}$, where $S_{l,k}$ is the transmitted sequence, and $H_{l,k}$ is the communication channel's impulse response. With the signal property $|S_k|=1$, the frequency-domain auto-correlation coefficients $R_k$ given by Eq. 8 can be written as:

$$R_k = \frac{1}{N} \sum_{l=0}^{L-1} |H_{l,k}|^2. \qquad (9)$$

Since we are interested in the PRS pattern properties without restricting to any specific channel, we can assume a unit channel decoupled from the transmit PRS power. With this assumption, Eq. 9 reduces to a scaled sum of transmit PRS powers, which is given by:

$$R_k = \frac{1}{N} \sum_{l=0}^{L-1} P_{l,k} \qquad (10)$$

in which $P_{l,k}$ is the transmit power of symbol l and subcarrier k. Those skilled in this art will understand that this description is not limited to any specific algorithms for computing DFTs and IDFTs. Suitable algorithms can be based on the fast Fourier transform, a direct transform, or any other approach.

PRS Power Optimization Problem

Now we can formulate a complete optimization problem, where the objective is to find PRS power allocation (unknown variables of the optimization model) by REs in the PRS REs. The optimization problem comprises an optimization objective (e.g., formulated in Eqs. 5 or 6), the relation between $R_k$ and $r_n$ modeled by Eq. 1, and the equation for computing the denominator in the objective function from Eq. 4. Note that with the aforementioned relations, it is not even necessary to apply an inverse fast Fourier transform (IFFT), since we can utilize the known properties to find the relation between the main peak (e.g., power or energy) and the total energy. The problem is a non-linear optimization problem. More constraints can be added to limit the set of feasible solutions. For example, if a PRS pattern is defined for a small subset of subcarriers and then repeated in the frequency domain in all physical resource blocks (PRBs) within the PRS bandwidth, this needs to be taken into account too by introducing a relevant set of constraints.

In one embodiment, to reduce the problem complexity and so the network and UE implementation complexity, it is possible to assume, for example, some pre-defined power split between REs on the same subcarrier, i.e., to define a unique mapping between $P_{l,k}$ and $R_k$. For example, if two PRS REs are allowed on subcarrier k in a PRS pattern, then the total power on the subcarrier over these RE defined by Eq. 10 can be equally split between the two PRS REs.

Figure 8A:
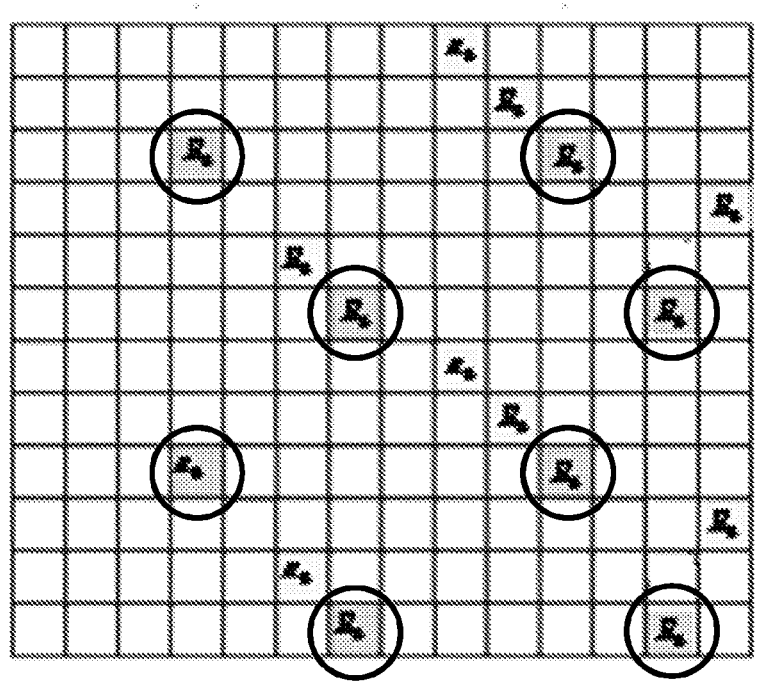
FIG. 8 shows a positioning reference signal pattern.

An application of such an approach is depicted in FIG. 8A, which shows an optimized PRS pattern on antenna port $R_6$. In some subcarriers (horizontal rows), there are two PRS REs (indicated by circling, such as the third row from the top), and in some subcarriers there is only one PRS RE (such as the second and fourth rows from the top). With an equal total power allocation per subcarrier, we get good auto-correlation properties, similar to what is shown in FIG. 7B (with a possible difference in the absolute values), but this implies that the PRS power per PRS RE need not be uniform over all PRS REs in the pattern, and there are many designs possible to achieve a given power vector corresponding to a given vector $R_k$. With an equal-split power approach, the two-PRS-RE subcarriers (i.e., the PRS REs on these subcarriers are gray squares marked R6 in FIG. 8A) get allocated power a factor of two lower compared to the one-PRS-RE subcarriers (i.e., the PRS REs on these subcarriers are white squares marked R6 in FIG. 8A).

In another embodiment of the invention, when there is at least one PRS allowed in each subcarrier, a virtual pattern based on a Costa array is created by assigning zero power in all PRS REs, except one, in each subcarrier such that only one non-zero-power PRS RE is present in each symbol in the PRS pattern. The virtual pattern has one non-zero-power PRS RE per subcarrier. For example, in each subcarrier with gray squares in the pattern depicted in FIG. 8A, one of the gray squares R6 is "transmitted" with zero power. Geometrically, a Costas array can be viewed as a set of n points lying on the squares of an n×n checkerboard, such that each row or column contains only one point. This property is achieved in the virtual pattern over the symbols where PRS can be transmitted. Since the number of RB subcarriers (12) is larger than the number of such symbols (8), the virtual pattern can be viewed as built from an 8×8 Costas array staggered on the top with an array of size 4×8.

Figure 8B:
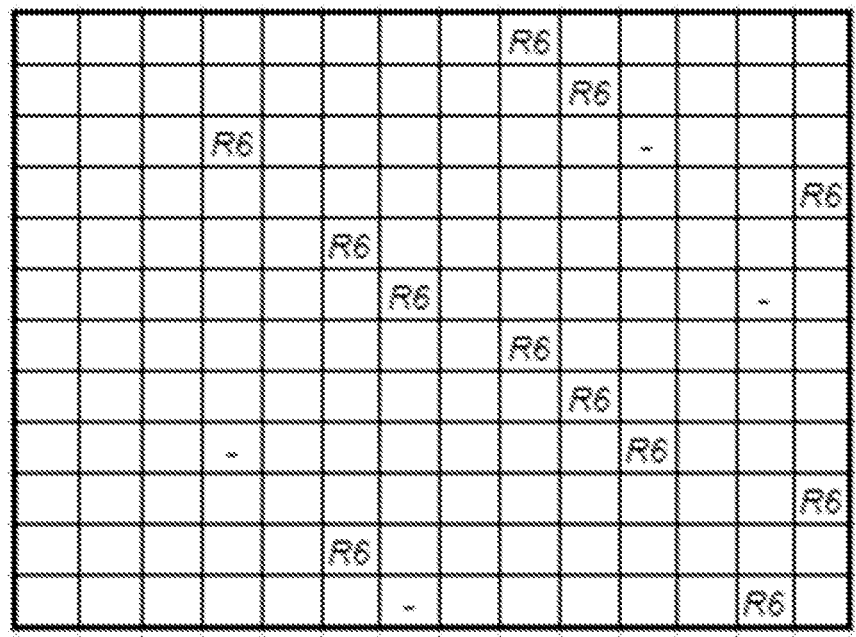

FIG. 8B depicts the exemplary virtual pattern, where "–" corresponds to REs where PRS is transmitted on antenna port R6 with "zero" power (which in practice means any transmit power level significantly lower than the reference power level, since a transmitter may be not able to transmit zero power with its power amplifier being ON).

Figure 8C:
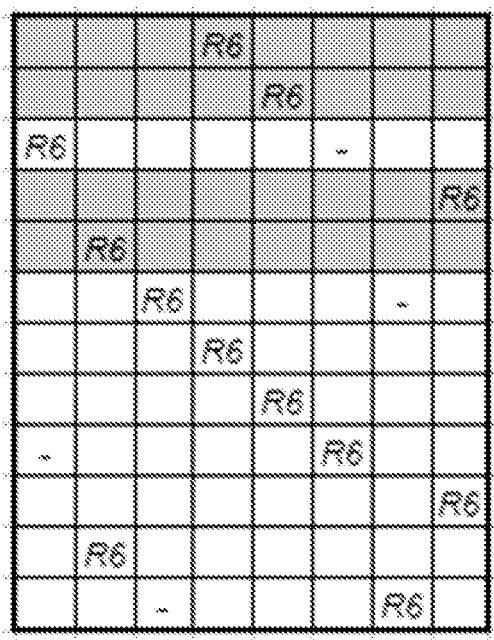

FIG. 8C illustrates an example of how the virtual pattern can be constructed from a Costas array, where only symbols with PRS REs are selected from FIG. 8A, the white area includes subcarriers that form a Costas array, and the gray area includes repeated rows from that array. It will be understood that the power levels can be set in various other ways to achieve the same goal.

Thus, it will be understood that a PRS pattern should be considered as more than just a set of REs of the same power level. This is different from the current standard, for example, which provides that within a positioning occasion (i.e., N consecutive downlink positioning subframes), the transmission power of PRS is the same in all PRS REs over all positioning subframes and across the entire PRS transmission bandwidth (which can be smaller than the system bandwidth).

The inventors' solutions described above can either be applied in a network node or in a UE as explained below.

PRS Pattern Modification/Shaping by Network Node

PRS having patterns as described above are transmitted by an eNodeB like other signals, but with appropriate power levels applied to enable shaping or with modified patterns obtained by shifting. PRS pattern shaping in the network can be done in a distributed, or localized, method or a centralized, or coordinated, method.

Distributed or Localized Method

The PRS power optimization problem detailed above can be solved locally in each eNodeB. One approach is an algorithm for PRS pattern shaping (i.e., controlling PRS transmit power according to Eq. 10) is implemented in an eNodeB. Power levels can be pre-configured or otherwise set, e.g., based on PCI.

Central or Coordinated Method

To maintain good interference coordination on PRS signals, a centralized power optimization approach is currently preferred, where a suitable unit, such as a positioning node 160 (e.g., an E-SMLC in LTE or another device that may have an interface with an E-SMLC) decides the PRS powers in a centralized manner for all or at least a subset of eNodeBs while coordinating interference among eNodeBs by adding an additional constraint to each per-eNodeB PRS power optimization problem. This means that local PRS power optimization problems are combined into a global optimization problem where PRS powers are decided simultaneously for multiple cells by the positioning node. Hence the recommended transmit power of the PRS pattern of a particular eNodeB is signaled to the eNodeB over the interface between the positioning node and the eNodeB, e.g., according to the LTE Positioning Protocol Annex (LPPa) protocol, which is described for example in 3GPP TS 36.455. Thus, sending an indication, or signaling, from a network node, such as an eNodeB or a positioning node in the core network, that the node implements a method described in this application is thus an embodiment of this invention.

To simplify UE implementation, which searches for the PRS from different cells, it is preferred to signal the relevant PRS transmit power(s) to the UE over the radio interface from a suitable network node, e.g., from an E-SMLC to a UE over the LPP protocol or from an eNodeB to a UE using the RRC protocol, which is described for example in 3GPP TS 36.331. Signaling the relevant PRS transmit power levels to a UE is thus an embodiment of this invention. In a currently preferred solution, the power levels can be encoded and a unique mapping between $R_k$ and $P_{l,k}$ is assumed, so there is no need to signal power levels for all PRS REs in the pattern, assuming the encoding table and the mapping are known to the UE.

Zero power levels can be indicated as muted PRS REs. The muting configuration can be signaled from the positioning node (e.g., an E-SMLC) to the UE using LPP messaging. The smallest muted element is currently a positioning occasion, which is a set of up to six consecutive positioning subframes, and the pattern is signaled as a binary string of one of several pre-defined lengths. For example, the string 0101 can indicate to the UE that PRS are muted every second positioning occasion starting from the first one. It will be understood that another indicator could be used, e.g., to indicate whether or not muting is used within a pattern (assuming that if muted, then always the same REs are muted or the group of muted REs can be found out, e.g., from the PCI) or an explicit muting pattern describing all PRS REs can be sent, e.g., as a binary string of 12×8 bits for symbols having the normal cyclic prefix.

FIG. 9A is a flow chart of a method of generating reference signals, such as PRS, in accordance with this invention as described above. In step 902, a predetermined reference signal such as the currently specified PRS is generated by a suitable electronic processor circuit or retrieved from a suitable electronic memory, which can be part of the processor circuit. The pre-determined reference signals are typically stored in a memory and retrieved by the processor as described below. In step 904, indicated by the dashed lines, the predetermined reference signal is modified (step 906) or pattern-shaped (step 908), resulting in one or more reference signals as described above. It can be noted that a "modified" PRS can be considered a PRS that has one or more changed REs in comparison to the currently specified PRS, and that a "shaped" PRS can be considered a PRS that has its signal level adjusted before correlation with a replica of the PRS.

FIG. 9B is a flow chart of a method of generating reference signals, such as PRS, by modifying a predetermined reference signal in accordance with this invention as described above. In step 902, a predetermined reference signal such as the currently specified PRS is generated by a suitable electronic processor circuit or retrieved from a suitable electronic memory, which can be part of the processor circuit. In step 904, indicated by the dashed lines, the predetermined reference signal is modified by cyclically shifting selected REs (step 906-1) in the predetermined reference signal. As described above, REs are selected and shifted such that one or more of the following occurs: empty subcarriers in the pre-determined PRS are filled with at least one RE; PRS REs are rearranged such that the PRS RE density over coherently accumulated segments (e.g., all symbols within a RB) is more uniform and preferably as uniform as possible; and the same frequency reuse as in the standardized patterns is maintained over all symbols where PRS is transmitted.

FIG. 9C is a flow chart of a method of generating reference signals, such as PRS, by applying signal shaping to a predetermined reference signal in accordance with this invention as described above. In step 902, a predetermined reference signal such as the currently specified PRS is generated by a suitable electronic processor circuit or retrieved from a suitable electronic memory, which can be part of the processor circuit. In step 904, indicated by the dashed lines, the predetermined reference signal is shaped by adjusting the transmitted and/or received power levels of selected REs (step 908-1) in the predetermined reference signal. Adjusting the transmitted power level can be carried out by an eNodeB as described above, and adjusting the received power level can be carried out by a UE as described above. When the adjustment is carried out by the UE, the adjustment is implemented before the correlator in the UE. As described above, REs in the predetermined reference signal are selected and power levels are adjusted such that the autocorrelation of the resulting reference signal is optimized, for example according to Eq. 5 to maximize the ratio of the squared power of the main autocorrelation peak to the total energy of the autocorrelation or to Eq. 6 to maximize the ratio of a metric that corresponds to the energy in the main autocorrelation peak accumulated over a number of samples (slots) to the total energy of the autocorrelation.

Figure 10:
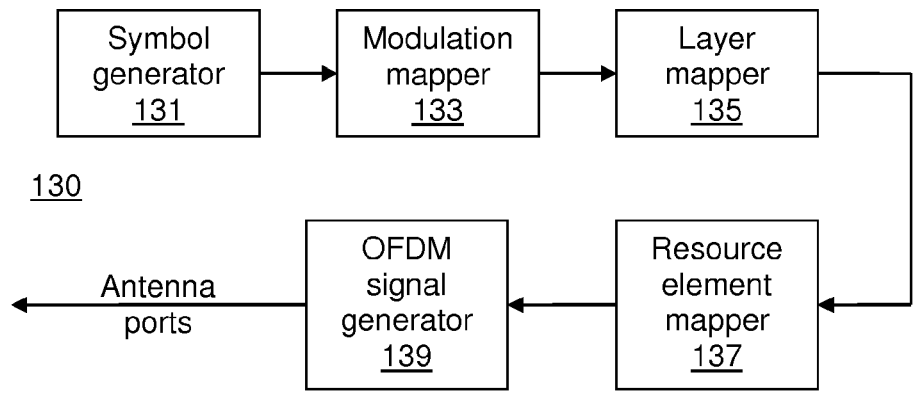
FIG. 10 is a block diagram of an example of a portion of transmitter for a communication system.

FIG. 10 is a block diagram of an example of a portion of an eNodeB 130 or similar transmitter for a communication system 100 that uses the reference signals described above. Several parts of such a transmitter are known and described for example in Clauses 6.3 and 6.4 of 3GPP TS 36.211 cited above. Reference signals having symbols as described above are produced by a suitable generator 131 and provided to a modulation mapper 133 that produces complex-valued modulation symbols. A layer mapper 135 maps the modulation symbols onto one or more transmission layers, which generally correspond to antenna ports as described above. An RE mapper 137 maps the modulation symbols for each antenna port onto respective REs, and an OFDM signal generator 139 produces one or more complex-valued time-domain OFDM signals for eventual transmission.

It will be appreciated that the functional blocks depicted in FIG. 10 can be combined and re-arranged in a variety of equivalent ways, and that many of the functions can be performed by one or more suitably programmed digital signal processors. Moreover, connections among and information provided or exchanged by the functional blocks depicted in FIG. 10 can be altered in various ways to enable a device to implement the methods described above and other methods involved in the operation of the device in a digital communication system.

PRS Pattern Modification/Shaping by UE

In another embodiment of the invention, generating modified or shaped PRS patterns (i.e., power reduction of the PRS pattern) is done by the UE, preferably before the correlator in the UE receiver. It is currently preferred that if power shaping is done in the UE, power shaping should not be done in the network.

One alternative is that by default the UE always performs PRS pattern shaping. This can be ensured by specifying requirements and test cases. For example, the OTDOA positioning requirements can be set such that the required accuracy can be achieved only if the PRS correlation properties are improved, thus forcing the UE to apply the shaping. Test cases can be specified to verify those requirements. The test setup is such that a UE will pass the test only if the UE performs the PRS pattern shaping.

Another alternative is that both eNodeB- and UE-based solutions are used, but only one is to be used at a time. Hence in this case a UE needs to be informed by the network whether the PRS shaping is done by the network or not, e.g., by signaling one bit. In case no PRS shaping is done by the network, the UE can perform it. Yet another alternative is that the network node explicitly commands or requests the UE when to perform PRS pattern shaping.

It will be appreciated that a UE-based solution can be easier to control and require less signaling, which uses system capacity. On the other hand, if a UE is not certain that PRS shaping is applied at the network side, the UE can make wrong decisions while performing measurements. From the point of view of system performance, it is currently believed that the shaping can be implemented at either the eNodeB side or the UE side.

It will also be appreciated that if an eNodeB is transmitting modified PRS into its cell that includes several UEs, then it is not necessary for all of the UEs to operate in the same way, i.e., without power shaping. PRS patterns modified by shifting may not be optimal, and so further modification by power shaping can be applied. The eNodeB can apply the power shaping, or those UEs that are capable of doing so can apply the power shaping. Even if the eNodeB PRS transmit power level is signaled to the UEs, all of the UEs in the eNodeB's cell do not have to operate in the same way.

Figure 11:
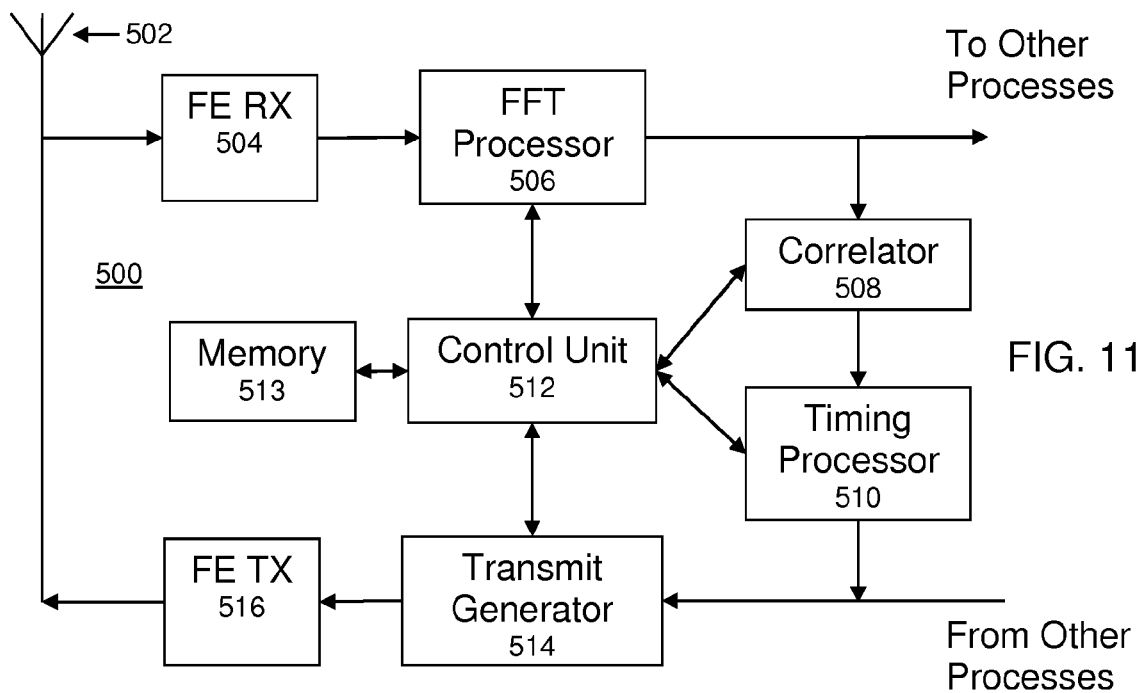
FIG. 11 is a block diagram of an arrangement in a user equipment.

FIG. 11 is a block diagram of an arrangement 500 in a UE 110 that can implement the methods described above. It will be appreciated that the functional blocks depicted in FIG. 11 can be combined and re-arranged in a variety of equivalent ways, and that many of the functions can be performed by one or more suitably programmed digital signal processors. Moreover, connections among and information provided or exchanged by the functional blocks depicted in FIG. 11 can be altered in various ways to enable a UE to implement other methods involved in the operation of the UE.

As depicted in FIG. 11, a UE receives a DL radio signal, including for example synchronization signals, CRS, and PRS, through an antenna 502 and typically down-converts the received radio signal to an analog baseband signal in a front end receiver (FE RX) 504. The baseband signal is typically spectrally shaped by one or more suitable filters and converted from analog form to digital form by a suitable analog-to-digital converter (not shown in FIG. 11).

The time-domain received signal generated by the FE RX 504 is provided to a processor 506 that typically includes a programmable processor or circuit that implements an FFT or other suitable algorithm and generates a frequency-domain (spectral) representation of the baseband received signal. The spectral representation is provided to other processes carried out by the UE and to a suitable correlator 508 that is configured to compare the received signal to a locally generated replica of the PRS or another signal known by the UE. As shown, the correlator is configured to operate on the received signal in the frequency domain, but it will be understood that the arrangement 500 can be configured such that the correlator operates on the received signal in the time domain. A correlation signal generated by the correlator 508 is provided to a suitable timing processor 510 that is configured to determine time instants of correlation peaks and other events of interest.

The processor 506, correlator 508, and processor 510 communicate with and are controlled by a control unit 512 that communicates with a memory unit 513, and are configured to handle PRS signals as described above in either the time domain or the frequency domain. As described above, the memory unit 513 can store predetermined PRS and provide the stored PRS for use by the control unit 512, and the memory unit 513 can simply be part of the control unit 512 (or for that matter in the processor 506, correlator 508, and/or the processor 510). For example, the control unit 512 can be configured such that the received signal power is modified in the frequency domain (power shaping) by suitably adjusting the signal provided by the processor 506 to the correlator 508. In this way, UE-side PRS power shaping can be implemented. The control unit 512 can determine the PRS replica used by the correlator 508 (and the PRS included in the received signal) in any suitable way, e.g., from OTDOA assistance data or other data received by the UE from an eNodeB.

The control unit 512 is further configured such that timing measurements generated by the processor 510 are provided to a transmit signal generator 514, which formats the information in a suitable way into messages and an UL signal that is provided to a transmitter front-end (FE TX) 516, which up-converts the signal and transmits the up-converted signal through the antenna 502 to an eNodeB 130. In particular, the timing measurements are signaled to the positioning node (for UE-assisted positioning) or used locally by the UE (e.g., for UE-based positioning).

In the arrangement depicted in FIG. 11, the control unit 512 keeps track of substantially everything needed to configure the processors 506, 510, correlator 508, and generator 514. This can include cell identity (for reference signal extraction and cell-specific scrambling of reference signals). Communication between the processor 506 and control unit 512 also includes, for example, cyclic prefix configuration. Although the correlator 508 and processor 510 are depicted in FIG. 11 as separate blocks, it will be appreciated that the control unit 512 can include a correlator or implement a correlator function, and can determine the timing information needed for UE positioning as described above.

The control unit and other blocks of the UE can be implemented by one or more suitably programmed electronic processors, collections of logic gates, etc. that processes information stored in one or more memories. The stored information can include program instructions and data that enable the control unit to implement the methods described above. It will be appreciated that the control unit typically includes timers, etc. that facilitate its operations.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system. UEs embodying this invention include, for example, mobile telephones, pagers, headsets, laptop computers and other mobile terminals, and the like. Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

Among the many advantages provided by this invention, there are the improved correlation properties of PRS patterns, and pattern shaping, which is a flexible way of creating virtual PRS patterns, for example, over those currently defined by the 3GPP standard. Pattern shaping can actually be applied to any other reference signal (which needs to be transmitted with a relatively sparse pattern). Pattern shaping by power adjustment also enables frequency control on the measured reference signals—a convenient network-adaptive approach, especially because other transmissions are in general not affected if the pattern shaping is done within positioning subframes (or equivalent assumed to be low-interference subframes without data transmissions). Pattern shaping by power adjustment (at the network side or the UE side) can also be applied to reference signals other than PRS. Muting on the subframe, symbol, or RE level are all special cases of the pattern shaping approach, if done by the network, just with extra constraints to ensure the desired interference management strategy. Different power levels of reference signals used for positioning can also be allowed within a positioning subframe in accordance with this invention, although it will be understood that such different power levels are not currently specified by 3GPP TS 36.213.

It will be appreciated that procedures described above are carried out repetitively as necessary, for example, to respond to the time-varying nature of communication channels between transmitters and receivers. In addition, it will be understood that the methods and apparatus described here can be implemented in various system nodes.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless devices implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a storage medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

What is claimed is:

1. A method of using reference signals (RS) in an orthogonal frequency division multiplex communication system in which the RS are organized in a RS pattern of resource elements (REs) that includes at least one of: a first plurality of columns corresponding to symbols and a second plurality of rows corresponding to subcarriers, and a set of power levels of RS REs, the method comprising:
   forming a modified RS pattern based on a predetermined RS pattern by at least one of:
      assigning respective different transmission power levels to selected REs of the predetermined RS pattern; and
      adjusting received signal power levels of selected REs of the predetermined RS pattern;
   wherein REs are selected and power levels are assigned or adjusted for maximizing a main peak of an autocorrelation of a received signal including the modified RS pattern.

2. The method of claim 1, wherein the main peak is maximized by maximizing either a ratio of a squared power of a main autocorrelation peak to a total energy of the autocorrelation or a ratio of a metric that corresponds to an accumulated energy in the main autocorrelation peak to the total energy of the autocorrelation.

3. The method of claim 1, wherein forming the modified RS pattern includes cyclically shifting REs in at least one column of the predetermined RS pattern; and REs in the at least one column of the predetermined RS pattern are cyclically shifted such that a number of REs per column and a space between REs in a column of the predetermined RS pattern is about the same as a number of REs per column and a space between REs in a column of the modified RS pattern.

4. The method of claim 1, wherein at least one empty subcarrier of the predetermined RS pattern is filled with an RE of the modified RS pattern.

5. The method of claim 1, wherein a density of RS REs over coherently accumulated segments of the modified RS pattern either is more uniform among subcarriers or varies more regularly among subcarriers relative to a density of RS REs over coherently accumulated segments of the predetermined RS pattern.

6. The method of claim 1, further comprising sending, to another network node, an indication whether the method is implemented in a network node in the communication system.

7. The method of claim 1, wherein an indication of the power levels is sent either to at least one of a base station and a positioning node, or to a user equipment according to either a Long Term Evolution Positioning Protocol or a Radio Resource Control protocol.

8. The method of claim 7, wherein the indication is included in Observed Time Difference of Arrival assistance data.

9. The method of claim 1, wherein the selected REs are selected by either an eNodeB or a positioning node in the communication system.

10. The method of claim 1, wherein REs are selected by a receiving node configured to reshape received signals before correlating the received signals with a local replica of the modified RS pattern.

11. A reference signal generator in an orthogonal frequency division multiplex communication system in which reference signals (RS) are organized in a RS pattern of resource elements (REs) that includes at least one of: a first plurality of columns corresponding to symbols and a second plurality of rows corresponding to subcarriers, and a set of power levels of RS REs, the generator comprising:
   an electronic processor configured to form a modified RS pattern based on a predetermined RS pattern by at least one of:
      assigning respective different transmission power levels to selected resource elements of the predetermined RS pattern; and
      adjusting received signal power levels of selected REs of the predetermined RS pattern;
   wherein REs are selected and power levels are assigned or adjusted for maximizing a main peak of an autocorrelation of a received signal including the modified RS pattern.

12. The generator of claim 11, wherein the main peak is maximized by maximizing either a ratio of a squared power of a main autocorrelation peak to a total energy of the autocorrelation or a ratio of a metric that corresponds to an accumulated energy in the main autocorrelation peak to the total energy of the autocorrelation.

13. The generator of claim 11, wherein the modified RS pattern is formed by cyclically shifting REs in at least one column of the predetermined RS pattern; and REs in the at least one column of the predetermined RS pattern are cyclically shifted such that a number of REs per column and a space between REs in a column of the predetermined RS pattern is about the same as a number of REs per column and a space between REs in a column of the modified RS pattern.

14. The generator of claim 11, wherein at least one empty subcarrier of the predetermined RS pattern is filled with an RE of the modified RS pattern.

15. The generator of claim 11, wherein a density of RS REs over coherently accumulated segments of the modified RS pattern either is more uniform among subcarriers or varies more regularly among subcarriers relative to a density of RS REs over coherently accumulated segments of the predetermined RS pattern.

16. The generator of claim 11, wherein the electronic processor is further configured to indicate the power levels to another node in the communication system.

17. The generator of claim 16, wherein the indication is sent either to at least one of a base station and a positioning node, or to a user equipment according to either a Long Term Evolution Positioning Protocol or a Radio Resource Control protocol.

18. The generator of claim 17, wherein the indication is included in Observed Time Difference of Arrival assistance data.

19. The generator of claim 11, wherein the generator is included in either an eNodeB or a positioning node in the communication system.

20. An apparatus for a user equipment in an orthogonal frequency division multiplex communication system for using reference signals (RS) organized in a RS pattern of resource elements (REs), comprising:
- a correlator;
- a modified RS pattern generator configured to generate a modified RS pattern based on a predetermined RS pattern that is included in a received signal, wherein the modified RS pattern includes selected REs of the predetermined RS pattern that have adjusted signal power levels; and
- an electronic processor configured to modify the received signal according to the modified RS pattern and form a modified received signal;
- wherein the correlator is configured to correlate the modified received signal and the modified RS pattern and form a correlation result; and REs are selected and power levels are adjusted for maximizing a main peak of an autocorrelation of a received signal including the modified RS pattern.

21. The apparatus of claim 20, wherein REs are selected and power levels are adjusted such that an autocorrelation of the modified RS pattern is optimized by maximizing either a ratio of a squared power of a main autocorrelation peak to a total energy of the autocorrelation or a ratio of a metric that corresponds to an accumulated energy in the main autocorrelation peak to the total energy of the autocorrelation.

22. The apparatus of claim 20, wherein the RS are positioning reference signals.

23. The apparatus of claim 20, wherein the apparatus is included in a user equipment.

* * * * *